(12) United States Patent
Cheng et al.

(10) Patent No.: US 12,069,538 B2
(45) Date of Patent: Aug. 20, 2024

(54) TECHNIQUES FOR MANAGING WIRELESS ANALYTICS IN SIDELINK COMMUNICATIONS

(71) Applicant: QUALCOMM Incorporated, San Diego, CA (US)

(72) Inventors: Hong Cheng, Basking Ridge, NJ (US); Kapil Gulati, Belle Mead, NJ (US); Qing Li, Princeton Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 17/400,454

(22) Filed: Aug. 12, 2021

(65) Prior Publication Data
US 2023/0050720 A1 Feb. 16, 2023

(51) Int. Cl.
*H04L 12/26* (2006.01)
*H04W 4/02* (2018.01)
(Continued)

(52) U.S. Cl.
CPC ........... *H04W 4/029* (2018.02); *H04W 4/023* (2013.01); *H04W 4/40* (2018.02); *H04W 24/10* (2013.01)

(58) Field of Classification Search
CPC ..... H04W 80/04; H04W 4/029; H04W 4/023; H04W 4/40; H04W 24/10; H04W 4/44; H04W 24/04; H04W 92/18; H04W 4/021; H04L 47/10; H04L 43/50; H04L 12/2697; H04L 43/0852; H04L 43/00; H04L 67/12; H04L 67/52
See application file for complete search history.

(56) References Cited

U.S. PATENT DOCUMENTS 9,807,183 B2 * 10/2017 Maguire ................. G16H 50/80
9,883,370 B2 * 1/2018 Kerning ................. H04W 4/02
(Continued)

FOREIGN PATENT DOCUMENTS

WO WO-2020232614 A1 11/2020

OTHER PUBLICATIONS

International Search Report and Written Opinion—PCT/US2022/037140—ISA/EPO—Oct. 31, 2022.

*Primary Examiner* — Phuongchau Ba Nguyen
(74) *Attorney, Agent, or Firm* — Dalei Dong; Holland & Hart LLP

(57) ABSTRACT

Techniques for wireless communications are described. A first device may receive first control signaling that may indicate a second device in a wireless communications system. The first device may then identify, based on the received first control signaling, a set of devices for tracking the second device in the wireless communications system. In some examples, the first device may then transmit second control signaling to the identified set of devices for tracking the second device in the wireless communications system. The first device may then receive, based on the transmitted second control signaling, coordination information from the set of devices. The received coordination information may be associated with the second device. The coordination information collected by the set of devices may be used to predict changes in an environment surrounding the second device. By predicting dynamic changes in the environment, disruptions in wireless communication may be prevented.

26 Claims, 18 Drawing Sheets

(51) Int. Cl.
*H04W 4/029* (2018.01)
*H04W 4/40* (2018.01)
*H04W 24/10* (2009.01)

(56) References Cited

U.S. PATENT DOCUMENTS

| | | | |
|---|---|---|---|
| 10,270,899 B1* | 4/2019 | Merjanian | G08B 21/0269 |
| 2014/0066018 A1* | 3/2014 | Zhu | H04W 12/02 |
| | | | 455/411 |
| 2015/0072713 A1* | 3/2015 | Zhu | H04W 8/005 |
| | | | 455/456.3 |
| 2016/0345165 A1 | 11/2016 | Hoefel et al. | |
| 2016/0358162 A1* | 12/2016 | Park | G06Q 50/01 |
| 2017/0180971 A1* | 6/2017 | Schuler | H04W 8/24 |
| 2018/0288599 A1* | 10/2018 | Zhao | H04W 76/14 |
| 2019/0238658 A1 | 8/2019 | Shimizu et al. | |
| 2020/0058305 A1* | 2/2020 | Yang | G10L 13/00 |
| 2020/0314612 A1 | 10/2020 | Kang et al. | |
| 2021/0250118 A1* | 8/2021 | Roth-Mandutz | H04W 72/56 |
| 2022/0264583 A1 | 8/2022 | Yang | |

\* cited by examiner

TECHNIQUES FOR MANAGING WIRELESS ANALYTICS IN SIDELINK COMMUNICATIONS

FIELD OF DISCLOSURE

The following relates to wireless communications, including techniques for managing wireless analytics in sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the present disclosure relate to managing wireless analytics for wireless communications, such as sidelink communications. In a wireless communications system (e.g., a cellular vehicle-to-everything (C-V2X) system), a communication device, such as a network entity (e.g., a base station) may utilize one or more communication devices (e.g., vehicles) operating within the C-V2X system to monitor and report coordination information associated with another communication device (e.g., a UE). The network entity may select the vehicles to participate in tracking the other communication device, for example a UE, based on a location of the UE and the path of the vehicles. The vehicles may be configured to track the UE in a geographic area or during a period. For example, a vehicle may be scheduled to move along a path and may be configured to monitor the UE while the vehicle may be located in a portion of the path.

The coordination information collected by the communication devices (e.g., vehicles) may be used by the network entity to predict changes in an environment surrounding the other communication device (e.g., the UE). For example, the vehicles in the C-V2X system may be configured to collect and report coordination information using one or multiple sensors (e.g., camera, radar, lidar), and the network entity may use the coordination information to determine potential factors in the environment (e.g., physical obstructions, reflections, or interfering radiations from other devices) that may impact wireless communications with the UE. By predicting dynamic changes in the environment, disruptions in wireless communication between a base station and a UE, or other communication devices in the communication system may be prevented, among other benefits.

A method for wireless communication at a first device is described. The method may include receiving first control signaling indicating a second device in a wireless communications system, identifying, based on the received first control signaling, a set of devices for tracking the second device in the wireless communications system, transmitting second control signaling to the set of devices for tracking the second device in the wireless communications system, and receiving, from the set of devices, coordination information associated with the second device based on the transmitted second control signaling.

An apparatus for wireless communication at a first device is described. The apparatus may include a processor, memory coupled with the processor, and instructions stored in the memory. The instructions may be executable by the processor to cause the apparatus to receive first control signaling indicating a second device in a wireless communications system, identify, based on the received first control signaling, a set of devices for tracking the second device in the wireless communications system, transmit second control signaling to the set of devices for tracking the second device in the wireless communications system, and receive, from the set of devices, coordination information associated with the second device based on the transmitted second control signaling.

Another apparatus for wireless communication at a first device is described. The apparatus may include means for receiving first control signaling indicating a second device in a wireless communications system, means for identifying, based on the received first control signaling, a set of devices for tracking the second device in the wireless communications system, means for transmitting second control signaling to the set of devices for tracking the second device in the wireless communications system, and means for receiving, from the set of devices, coordination information associated with the second device based on the transmitted second control signaling.

A non-transitory computer-readable medium storing code for wireless communication at a first device is described. The code may include instructions executable by a processor to receive first control signaling indicating a second device in a wireless communications system, identify, based on the received first control signaling, a set of devices for tracking the second device in the wireless communications system, transmit second control signaling to the set of devices for tracking the second device in the wireless communications system, and receive, from the set of devices, coordination information associated with the second device based on the transmitted second control signaling.

Some examples of the method, apparatuses, and non-transitory computer-readable medium described herein may further include operations, features, means, or instructions for determining one or more of a geolocation or a cell identifier associated with a serving cell of the second device based on the received first control signaling, where identifying the set of devices for tracking the second device may be based on one or more of the geolocation or the cell identifier associated with the serving cell of the second device.

Some examples of the method, apparatuses, and non-transitory computer-readable medium described herein may further include operations, features, means, or instructions for determining a geolocation and a mobility trace of the second device based on the received first control signaling, where identifying the set of devices for tracking the second device may be based on the geolocation and the mobility trace of the second device.

Some examples of the method, apparatuses, and non-transitory computer-readable medium described herein may further include operations, features, means, or instructions for determining capability information associated with each device of the set of devices, the determined capability information indicating a set of resources and selecting the set of devices for tracking the second device based on the determined capability information, where transmitting the second control signaling may be based on selecting the set of devices for tracking the second device.

Some examples of the method, apparatuses, and non-transitory computer-readable medium described herein may further include operations, features, means, or instructions for determining mobility information associated with each device of the set of devices, the determined mobility information indicating an estimated route of each device of the set of devices in the wireless communications system and selecting the set of devices for tracking the second device based on the determined mobility information, where transmitting the second control signaling may be based on selecting the set of devices for tracking the second device.

Some examples of the method, apparatuses, and non-transitory computer-readable medium described herein may further include operations, features, means, or instructions for selecting a node in the wireless communications system for communicating the second control signaling based on a geolocation of one or more devices of the set of devices, the selected node including a roadside unit (RSU) or a base station, where transmitting the second control signaling to the set of devices may be based on the selected node in the wireless communications system.

In some examples of the method, apparatuses, and non-transitory computer-readable medium described herein, the second control signaling includes a service type parameter indicating one or more of a provider service identifier, an intelligent transportation system application identifier, or an application identifier.

Some examples of the method, apparatuses, and non-transitory computer-readable medium described herein may further include operations, features, means, or instructions for transmitting, to the second device, third control signaling to enable a sidelink ranging operation, where tracking the second device may be based on the sidelink ranging operation.

Some examples of the method, apparatuses, and non-transitory computer-readable medium described herein may further include operations, features, means, or instructions for transmitting third control signaling requesting the second device to measure one or more metrics associated with sidelink communication over a sidelink and receiving fourth control signaling including a report of the one or more metrics, where the second control signaling includes an indication of the one or more metrics associated with the sidelink communication identifying the second device in the wireless communications system.

In some examples of the method, apparatuses, and non-transitory computer-readable medium described herein, the one or more metrics include a reference signal received power (RSRP), a reference signal strength indicator (RSSI), or a combination thereof.

Some examples of the method, apparatuses, and non-transitory computer-readable medium described herein may further include operations, features, means, or instructions for transmitting, in the second control signaling, an indication for the set of devices to form a group for tracking the second device in the wireless communications system, the set of devices in the formed group sharing sensing information over a sidelink for tracking the second device.

Some examples of the method, apparatuses, and non-transitory computer-readable medium described herein may further include operations, features, means, or instructions for determining channel estimation associated with the second device in the wireless communications system based on the received coordination information and performing the wireless communication with the second device based on the determined channel estimation associated with the second device.

Some examples of the method, apparatuses, and non-transitory computer-readable medium described herein may further include operations, features, means, or instructions for determining interference information associated with the second device in the wireless communications system based on the received coordination information and performing the wireless communication with the second device based on the determined interference information associated with the second device.

Some examples of the method, apparatuses, and non-transitory computer-readable medium described herein may further include operations, features, means, or instructions for updating the set of devices with one or more parameters for tracking the second device based on the received first control signaling, the one or more parameters corresponding to network conditions associated with the second device, where identifying the set of devices for tracking the second device may be based on the updating.

Some examples of the method, apparatuses, and non-transitory computer-readable medium described herein may further include operations, features, means, or instructions for performing one or more of a beam management operation or a resource allocation operation based on the received coordination information.

In some examples of the method, apparatuses, and non-transitory computer-readable medium described herein, the first device includes a vehicle-to-everything (V2X) application server, the wireless communications system includes a C-V2X system, the set of devices includes a set of vehicles, and the second device includes a user equipment (UE).

A method for wireless communication at a first device is described. The method may include receiving, from a network device, first control signaling indicating a second device in a wireless communications system, identifying, based on the received first control signaling, the second device in the wireless communications system, tracking the second device using a set of resources associated with the first device, and transmitting, to the network device, coordination information associated with the second device based on the tracking.

An apparatus for wireless communication at a first device is described. The apparatus may include a processor, memory coupled with the processor, and instructions stored in the memory. The instructions may be executable by the processor to cause the apparatus to receive, from a network device, first control signaling indicating a second device in a wireless communications system, identify, based on the received first control signaling, the second device in the wireless communications system, track the second device using a set of resources associated with the first device, and transmit, to the network device, coordination information associated with the second device based on the tracking.

Another apparatus for wireless communication at a first device is described. The apparatus may include means for receiving, from a network device, first control signaling indicating a second device in a wireless communications system, means for identifying, based on the received first control signaling, the second device in the wireless communications system, means for tracking the second device using a set of resources associated with the first device, and means for transmitting, to the network device, coordination information associated with the second device based on the tracking.

A non-transitory computer-readable medium storing code for wireless communication at a first device is described. The code may include instructions executable by a processor to receive, from a network device, first control signaling indicating a second device in a wireless communications system, identify, based on the received first control signaling, the second device in the wireless communications system, track the second device using a set of resources associated with the first device, and transmit, to the network device, coordination information associated with the second device based on the tracking.

Some examples of the method, apparatuses, and non-transitory computer-readable medium described herein may further include operations, features, means, or instructions for identifying a set of candidate second devices in the wireless communications system and selecting the second device from the set of candidate second devices based on information associated with the second device, where identifying the second device in the wireless communications system may be based on the selecting.

Some examples of the method, apparatuses, and non-transitory computer-readable medium described herein may further include operations, features, means, or instructions for transmitting second control signaling requesting additional information associated with the second device based on a condition, the condition including an unsuccessful attempt to identify the second device and receiving third control signaling indicating the additional information associated with the second device based on the transmitted second control signaling.

Some examples of the method, apparatuses, and non-transitory computer-readable medium described herein may further include operations, features, means, or instructions for broadcasting a sidelink message to enable a sidelink ranging operation at the second device, where identifying the second device in the wireless communications system may be based on the sidelink ranging operation.

Some examples of the method, apparatuses, and non-transitory computer-readable medium described herein may further include operations, features, means, or instructions for determining to form a group of devices for tracking the second device in the wireless communications system based on the received first control signaling, the set of devices in the formed group sharing sensing information over a sidelink for tracking the second device, where tracking the second device may be based on the group of devices.

Some examples of the method, apparatuses, and non-transitory computer-readable medium described herein may further include operations, features, means, or instructions for determining a sidelink ranging coordination between the group of devices based on the received first control signaling and performing a sidelink ranging operation based on the determined sidelink ranging coordination, where tracking the second device may be based on the performed sidelink ranging operation.

Some examples of the method, apparatuses, and non-transitory computer-readable medium described herein may further include operations, features, means, or instructions for performing a sidelink ranging operation based on an estimated route of the first device and a geolocation of the second device in the wireless communications system, where tracking the second device may be based on the performed sidelink ranging operation.

Some examples of the method, apparatuses, and non-transitory computer-readable medium described herein may further include operations, features, means, or instructions for determining channel estimation associated with the second device in the wireless communications system based on tracking the second device, where the coordination information includes the determined channel estimation associated with the second device.

Some examples of the method, apparatuses, and non-transitory computer-readable medium described herein may further include operations, features, means, or instructions for determining interference information associated with the second device in the wireless communications system based on tracking the second device, where the coordination information includes the determined interference information associated with the second device.

In some examples of the method, apparatuses, and non-transitory computer-readable medium described herein, the first device includes a vehicle, the wireless communications system includes a C-V2X system, and the second device includes a UE.

DETAILED DESCRIPTION

Figure 1:
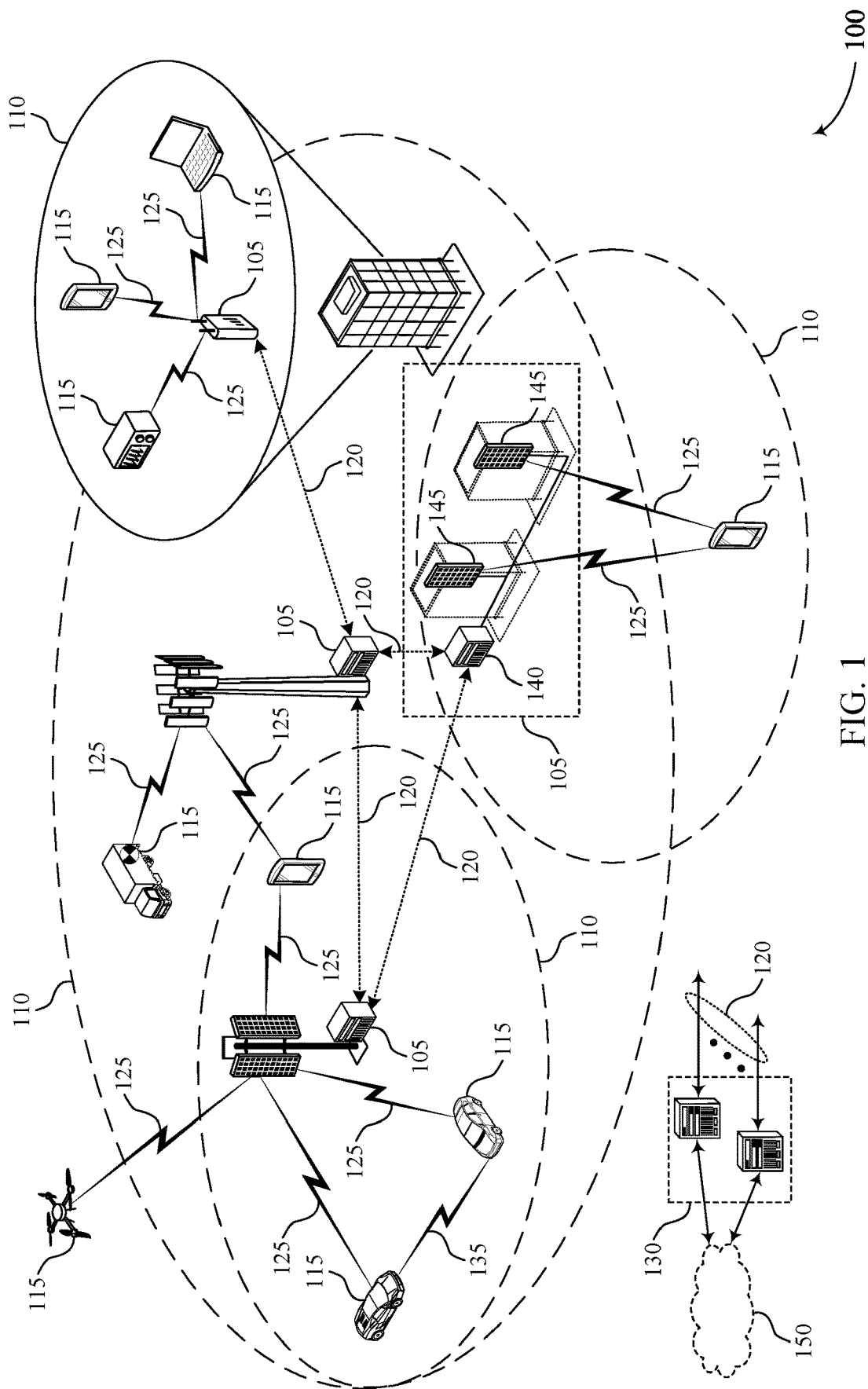
FIGS. 1 through 4 illustrate examples of wireless communications systems that support techniques for managing wireless analytics in sidelink communications in accordance with various aspects of the present disclosure.

A wireless communications system may support both access links and sidelinks for wireless communications between communication devices. An access link may refer to a communication link between a base station and a UE (e.g., via a Uu interface in an NR system). For example, an access link may support uplink signaling, downlink signaling, connection procedures, etc. A sidelink may refer to a communication link between similar communication devices (e.g., a communication link between UEs via a PC5 interface, or a backhaul communication link between base stations such as an integrated access and backhaul (IAB) communication link). It is noted that while various examples provided herein are discussed for UE sidelink devices, such sidelink techniques may be used for any type of wireless communications devices (e.g., UEs, base stations, etc.) that use sidelink communications. For example, a sidelink may support device-to-device (D2D) communication, vehicle-to-everything (V2X), cellular vehicle-to-everything (C-V2X), or vehicle-to-vehicle (V2V) communication, proximity-based services (ProSe) communication, PC5 communication, IAB communication, message relaying, discovery signaling, beacon signaling, or any combination of these or other signals transmitted over-the-air from between devices.

In some cases, a communication device (e.g., a network entity) may collect information to determine how a network may be performing at various locations throughout a network coverage area of a wireless communications system. For example, a network entity may configure UEs operating in the wireless communications system to report performance and location information to the network entity. The network entity may then use the reported information to train or develop machine learning models that may be used to enhance network performance. For example, machine learning models may be used to update one or more parameters of the wireless communications system in at least some locations, such as through adjusting one or more parameter values or other settings. The network entity may also use machine learning models (e.g., perceptive wireless) to control communications between communication devices (e.g., UEs and base stations) operating within the wireless communications system.

For example, the network entity may use perceptive wireless analytics for beamforming management, handover operations, or transmission rescheduling to avoid service interruptions. In some cases, information collected by the network entity may be static (e.g., stored) information. For example, a network entity may use drive testing mechanisms to determine a network performance at various locations throughout a network coverage area. However, in some cases, dynamic factors may impact wireless communications throughout the network coverage area. For example, in a wireless communications system, a path of a moving vehicle may intersect a direct path between a base station and a UE. In such an example, the vehicle may temporarily disrupt wireless communications between the base station and the UE. To mitigate potential disruptions to wireless communications, various aspects of the present disclosure relate to enabling communication devices to actively collect information regarding a status, a location (e.g., geolocation), and environmental factors (e.g., blockages, weather conditions, reflections, or interferences, among other examples) associated with UEs operating within the wireless communications system. In some examples, various sidelink connections between communication devices supporting sidelink operations may be used to support data collection in the wireless communications system.

One or more aspects of the present disclosure provide for supporting coordination information by actively collecting UE status, location information, and environmental factors to assist perceptive wireless predictions. For example, a network may utilize one or more UEs associated with mobile vehicles operating within a wireless communications system to actively monitor a respective UE. Information collected by the one or more UEs associated with mobile vehicles may be used to predict dynamic changes in an environment surrounding the respective UE. For example, a UE associated with a vehicle may be configured to collect UE information with multiple sensors (e.g., camera, radar, lidar). In some cases, a network entity (e.g., a base station, network control entity, an application server, among other examples) may determine a type of sensor information to be collected by the UE.

The network entity may use the collected information to determine objects that may act as blockers (e.g., physical obstructions) and may impact wireless communications for the UE, for example, such as experience signal loss or interference. In some cases, the network entity may select one or more UEs associated with mobile vehicles to participate in monitoring the respective UE based on the location of the respective UE and the path of the UEs. In some examples, the one or more UEs associated with mobile vehicles may be configured to monitor the respective UE in an area or during a duration. For example, a UE associated with a vehicle may be scheduled to move along a path and may be configured to monitor the respective UE while the UE associated with a vehicle may be located in a portion of the path.

In some examples, the information to be collected by the fleet of UEs may be determined by the network, and it may include other information in addition or alternatively to the physical status information of the respective UE to track. For example, the information may include additional information about for example a radio interference source (e.g., there is a known wireless local area network (WLAN) access point, or some power equipment's somewhere, etc. The network entity may also use the collected information to determine whether any potential interference may impact the wireless communications for the UE. For example, based on the collected information, there may be known sources of interfering radio transmitters at one or more locations. In such cases, the network entity may predict when such interference may apply to the UE based on the location and planned path of the UE.

Aspects of the subject matter described herein may be implemented to realize one or more advantages. The present disclosure may support improvements in wireless communications systems by reducing signaling and avoiding service interruptions. Further, in some examples, managing wireless analytics in sidelink communications, as described herein, may support higher data rates, thereby improving latency and reliability. As such, supported techniques may include improved network operations, and, in some examples, may promote network efficiencies, among other benefits.

FIG. 1 illustrates an example of a wireless communications system 100 that supports techniques for managing wireless analytics in sidelink communications in accordance with various aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical)

communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or radio frequency spectrum band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) radio frequency spectrum bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-todevice (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units (RSUs), or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some examples, various functions of each access network entity 140 or base station 105 may be distributed across various network devices (e.g., radio heads and ANCs) or consolidated into a single network device (e.g., a base station 105).

The wireless communications system 100 may operate using one or more radio frequency spectrum bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), unlicensed radio frequency spectrum band radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The wireless communications system 100 may support managing wireless analytics for wireless communications including sidelink communications. For example, a communication device, such as an application server or other network entity (e.g., a network control entity, a base station 105) may receive first control signaling that may indicate a target communication device (e.g., a target UE 115) in the wireless communications system 100. The application server may then identify, based on the received first control signaling, a set of communication devices (e.g., UEs 115) for tracking the target communication device (e.g., the target UE 115) in the wireless communications system 100. The application server may transmit second control signaling to the identified set of UEs 115 for tracking target communication device (e.g., the target UE 115) in the wireless communications system 100.

The application server may then receive, based on the transmitted second control signaling, coordination information from the set of UEs 115. The received coordination information may be associated with the target UE 115. The coordination information collected by the set of communication devices (e.g., the set of UEs 115) may be used by the application server to predict changes in an environment surrounding the target communication device (e.g., the target UE 115). By predicting dynamic changes in the environment, disruptions in wireless communication between a base station 105 and a UE 115, or other communication devices in the wireless communications system 100 may be prevented, among other benefits.

Figure 2:
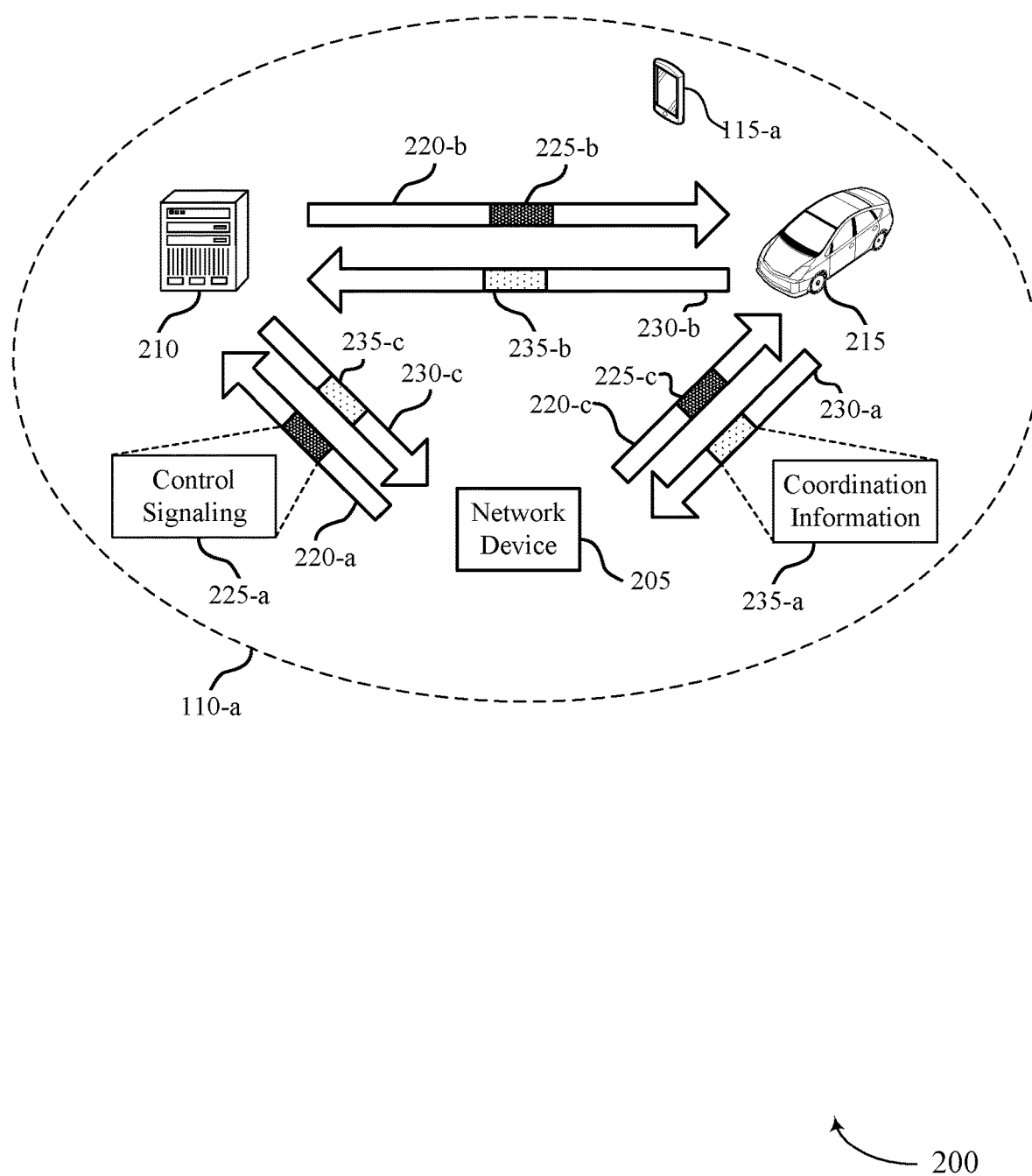

FIG. 2 illustrates an example of a wireless communications system 200 that supports techniques for managing wireless analytics in sidelink communications in accordance with various aspects of the present disclosure. In some examples, the wireless communications system 200 may implement aspects of the wireless communications system 100. For example, the wireless communications system 200 may include a UE 115-a which may be an example of a UE 115 described with reference to FIG. 1. The wireless communications system 200 may be an example of a C-V2X system. Additionally, the wireless communications system 200 may include a UE 215 which may be an example of a vehicle in the C-V2X system. The wireless communications system 200 may also include a network device 205 which may be an example of a base station 105 or a logical entity (e.g., a RAN intelligence controller (MC)) that may manage one or more base stations 105 described with reference to FIG. 1. Additionally, the wireless communications system 200 may include an application server 210 which may be an entity associated with the core network 130 described with reference to FIG. 1. The UE 115-a, the UE 215, the application server 210, and the network device 205 may communicate within a geographic coverage area 110-a which may be an example of a geographic coverage area 110 described with reference to FIG. 1.

In the example of FIG. 2, the network device 205 may transmit one or more signals to the application server 210 via a communication link 220-a (e.g., an access link or a sidelink) and the application server 210 may transmit one or more signals to the network device 205 via a communication link 230-c (e.g., an access link). The application server 210 may transmit one or more signals to the UE 215 via a communication link 220-b and the UE 215 may transmit one or more signals to the application server 210 via a communication link 230-b. The UE 215 may transmit one or more signals to the network device 205 via a communication link 230-a and the network device 205 may transmit one or more signals to the UE 215 via a communication link 220-c. In some examples, the UE 215 may communicate with the UE 115-a via a sidelink and the network device 205 may communicate with the UE 115-a via an access link.

In some cases, the wireless communication system 200 may support techniques for collecting coordination information associated with the UE 115-a operating within the wireless communications system 200. In some examples, the coordination information may be collected using one or multiple sensors (e.g., camera, radar, lidar), and may indicate information related to the status of the UE 115-a, the location of the UE 115-a, or potential factors in the environment (e.g., physical obstructions, reflections, or interfering radiations from other devices) of the UE 115-a. For example, the wireless communication system 200 may utilize UE information for perceptive wireless to improve beamforming management, handover operations, or scheduling, among other examples. In some cases, information collected by one or more devices in the wireless communication system 200 may be static (e.g., stored) information that may not account for dynamic factors which may impact communication throughout the wireless communication system 200. In these cases, it may be useful to utilize UEs associated with mobile vehicles in the wireless communication system 200 (e.g., the UE 215) to assist network data collection.

For example, the application server 210 may receive control signaling 225-a (e.g., via the communication link 220-a) that may indicate a target communication device (e.g., the UE 115-a). The application server 210 may then identify, based on the received control signaling 225-a, a set of communication devices (e.g., one or more UEs 215) for tracking the UE 115-a. In some examples, the application server 210 may transmit control signaling 225-b (e.g., via the communication link 220-b) to the UE 215 for tracking the UE 115-a. In some examples, the application server 210 may receive coordination information 235-b (e.g., via the communication link 230-b) from the UE 215 based on the transmitted control signaling 225-b. In some cases, the application server 210 may transmit coordination information 235-c to the network device 205 via the communication link 230-c. Additionally or alternatively, the UE 215 may receive control signaling 225-c from the network device 205 via the communication link 220-c. In some examples, the UE 215 may determine the UE 115-a based on the control signaling 225-c, and then, may track the UE 115-a using a set of resources associated with the UE 215. The UE 215 may transmit coordination information (e.g., a coordination information 235-a) to the network device 205 via the communication link 230-a. In some examples, the coordination information 235-a, the coordination information 235-b, and the coordination information 235-c may be associated with the UE 115-a.

By predicting dynamic changes in the wireless communication system 200, disruptions in wireless communication between devices in the wireless communication system 200 may be prevented, among other benefits.

Figure 3:
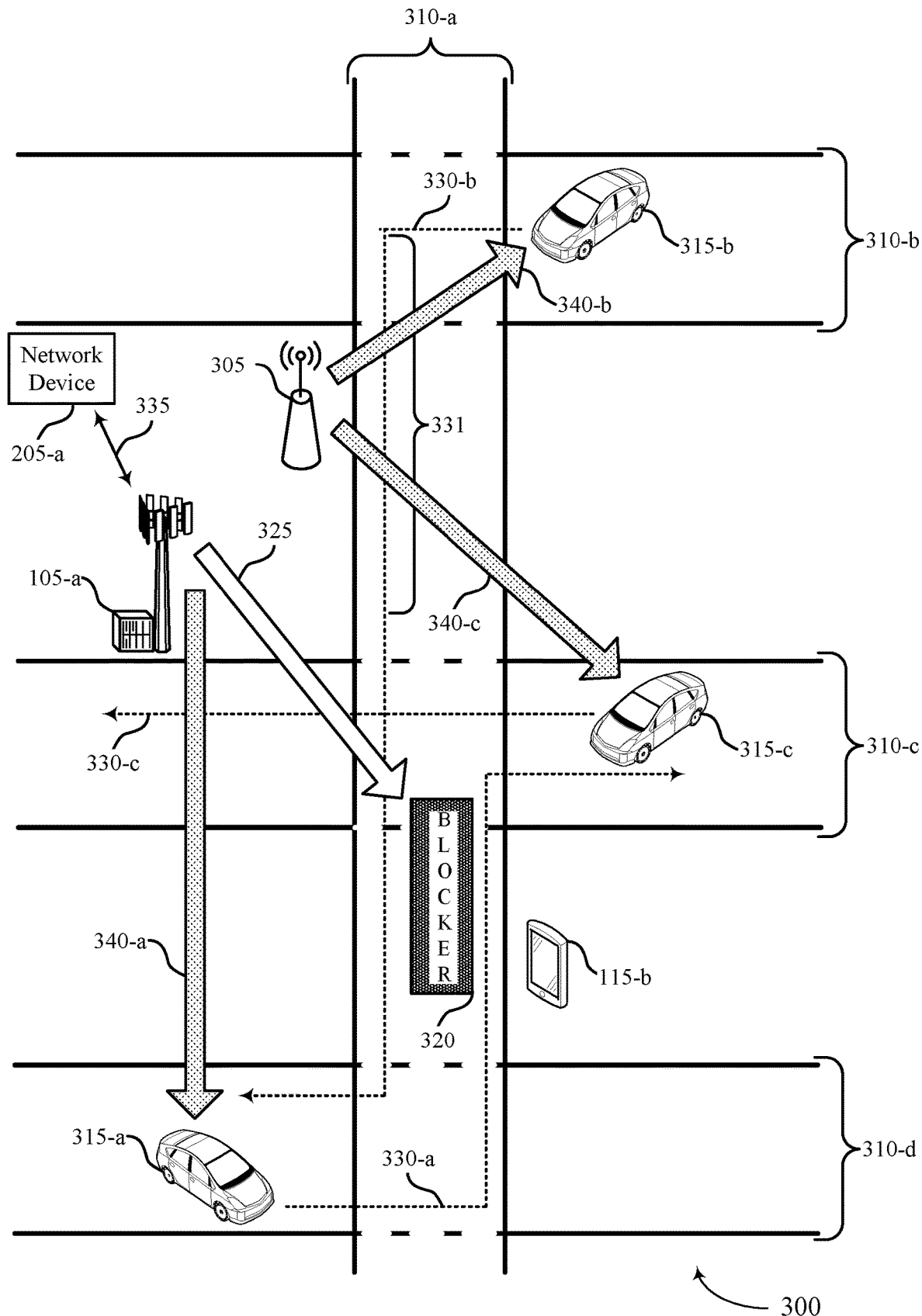

FIG. 3 illustrates an example of a wireless communications system 300 that supports techniques for managing wireless analytics in sidelink communications in accordance with various aspects of the present disclosure. In some examples, wireless communications system 300 may implement aspects of the wireless communications system 100 and the wireless communications system 200. For example, the wireless communications system 300 may include a base station 105-a and a UE 115-b which may be examples of the corresponding devices described with reference to FIG. 1. Additionally, the wireless communications system 300 may be an example of a C-V2X system and include one or more UEs 315 which may be examples of vehicles in the C-V2X system. The wireless communications system 300 may also include a network device 205-a which may be an example of the corresponding device described with reference to FIG. 2. Additionally, the wireless communications system 300 may include a roadside unit (RSU) 305.

The RSU 305 may be one of a number of RSUs that are located at intervals along a roadway 310 (e.g., associated with a portion of a roadway 310-a, an intersecting roadway 310-b, an intersecting roadway 310-c, and an intersecting roadway 310-d). In the example of FIG. 3, the UEs 315 may each be associated with a vehicle travelling along the roadways 310, and may operate using sidelink communications in a C-V2X system. The roadways 310 may be any of a number of different types of roadways, or combinations of different types of roadways (e.g., divided highways or streets, undivided highways or streets, tunnels, over/under passes, bridges, etc.). In some examples, the UEs 315 may transmit one or more signals (e.g., via a sidelink 340) to the UEs 315 operating in the wireless communications system 300. In some cases, the RSU 305 may coordinate with one or more other neighboring RSUs 305 via backhaul links (e.g., fiber links or wireless IAB links).

In some examples, one or more devices in the wireless communications system 300 may actively collect (e.g., using the network device 205-a) information regarding the status and location of one or more UEs operating within the wireless communications system 300. For example, one or more of the base station 105-a or the network device 205-a may use the UE status and location information for perceptive wireless to determine or predict characteristics between the base station 105-a and the UE 115-b (e.g., in an urban area). In some cases, one or more of the base station 105-a or the network device 205-a may use perceptive wireless for beam management to improve network performance or to predict blockages (e.g., blockages caused by a blocker 320). In some cases, predicting blockages may enable the base station 105-a to adjust planned transmissions thereby reducing signal loss or interference that may be caused by the blockages. However, in some cases, perceptive wireless predictions may be based on static or historical data collected, for example, via drive tests or mapping applications. In such cases, perceptive wireless predictions may not account for dynamic changes in the environment of the UE (e.g., transient blockages). Additionally, in some case, one or more of the base station 105-a or the network device 205-a may also collect information associated with UE measurements. However, such information (e.g., and the resulting analytics) may be associated with the UE that performed the measurements and may not be applicable to other UEs operating within the wireless communications system 300. In some examples, the network device 205-a may communicate with the base station 105-a via a communication link 335.

In some examples, one or more of the base station 105-a or the network device 205-a may utilize UEs associated with mobile vehicles (e.g., the UEs 315) to assist network data collection. For example, the base station 105-a may perform perceptive wireless in a geographic coverage area (e.g., a geographic coverage area associated with an urban area) where one or more vehicle may be operating. In such an example, the base station 105-a may utilize UEs associated with such vehicles (e.g., the UEs 315) to collect information (e.g., data) associated with the status and position of other UEs (e.g., the UE 115-b) operating within the same geographic coverage area. For example, the blocker 320 may be a vehicle traveling along a path (e.g., a path along the roadway 310-a) that may intersect the direct path between the UE 115-b and the base station 105-a. In such an example, signals transmitted from the base station 105-a (e.g., via an access link 325) may be obstructed or blocked, and the likelihood that the UE 115-b receives the transmitted signals may be low. However, in some cases, one or more UEs 315 may have line of sight with the UE 115-b. In such cases, one or more of the base station 105-a or the network device 205-a may utilize the UEs 315 to collect data associated with the UE 115-b for perceptive wireless predictions. That is, one or more of the base station 105-a or the network device 205-a may utilize the UEs 315 to track the UE 115-b for perceptive wireless predictions. In some cases, one or more of the base station 105-a or the network device 205-a may determine one or more relevant UEs 315 to participate in tracking the UE 115-b.

For example, one or more of the base station 105-a or the network device 205-a may collect data associated with the UE 115-b and, accordingly, one or more of the base station 105-a or the network device 205-a may determine that one or more UEs 315 are relevant to the data collection. In some cases, one or more of the base station 105-a or the network device 205-a may determine that one or more UEs 315 are relevant to data collection based on the location of the UE 115-b and a path of the UE 315. For example, a path of a UE 315-c (e.g., a path 330-c) may follow the intersecting roadway 310-c. As such, one or more of the base station 105-a or the network device 205-a may determine that the UE 315-c may be not be relevant to data collection associated with the UE 115-b. Additionally or alternatively, a path of a UE 315-a (e.g., a path 330-a) and a path of a UE 315-b (e.g., a path 330-b) may include the roadway 310-a and, therefore, one or more of the base station 105-a or the network device 205-a may determine that the UE 315-a and the UE 315-b are relevant to data collection associated with the UE 115-b. In some cases, one or more of the base station 105-a or the network device 205-a may also determine one or more portions (e.g., a portion 331) of the path during which the UE 315 (e.g., the UE 315-b) may be relevant. In some instances, determining one or more relevant portions may increase data collection efficiency.

In some examples, the UEs 315 may be equipped with multiple sensors (e.g., camera, radar, lidar) which may be used to collect data which may not be otherwise available to one or more of the base station 105-a or the network device 205-a for perceptive wireless analytics. In some cases, one or more of the base station 105-a or the network device 205-a may determine one or more of sensors at the UE 315 to use for data collection. In some instance, one or more sensors may be associated with one or more operations (e.g., sidelink positioning) that one or more of the base station 105-a or the network device 205-a may determine to be relevant. In some cases, sidelink communications in a C-V2X system may enable multiple UEs 315 to collaborate and coordinate data collection (e.g., data collection associated with the UE 115-b). Coordinated data collection by multiple UEs 315 may provide for federated learning and information collection. For example, there may be portions of the path 330-b where the UE 315-b may not have line of sight with (i.e., a direct path to) the UE 115-b, but other UEs 315 (e.g., the UE 315-a, the UE 315-c, or both) may have a direct path to the UE 115-b. In such cases, it may be desirable for the UE 315-b to collaborate (e.g., perform a handover procedure) with the other UEs 315 to provide for continuous monitoring (e.g., data collection) of the UE 115-b.

In some examples, characteristics associated with the UEs 315 may be known to one or more of the base station 105-a or the network device 205-a. For instance, one or more of the base station 105-a or the network device 205-a may know the path a UE 315 may travel as well as the sensors the UE 315 may be equipped with. For example, multiple UEs 315 (e.g., a fleet) may have planned routs (e.g., paths) which the associated vehicles may travel. Additionally, the fleet of UEs 315 may be equipped with sensors or operating platforms for machine learning. In some cases, the sensors may be used to detect object that may cause potential communication blockages between the UE 115-b and the base station 105-a. In some additional cases, the sensors may be used to detect the UE 115-b as well as predict movements by the UE 115-b. In some examples, the fleet of UEs may be associated with public transportation vehicles (e.g., buses or trams) operated by municipal operators. In some other examples the fleet of UEs may be associated with delivery vehicles operated by one or more private corporations. In yet some other examples, the fleet of UEs may be taxis, or application based ride sharing vehicles.

Figure 4:
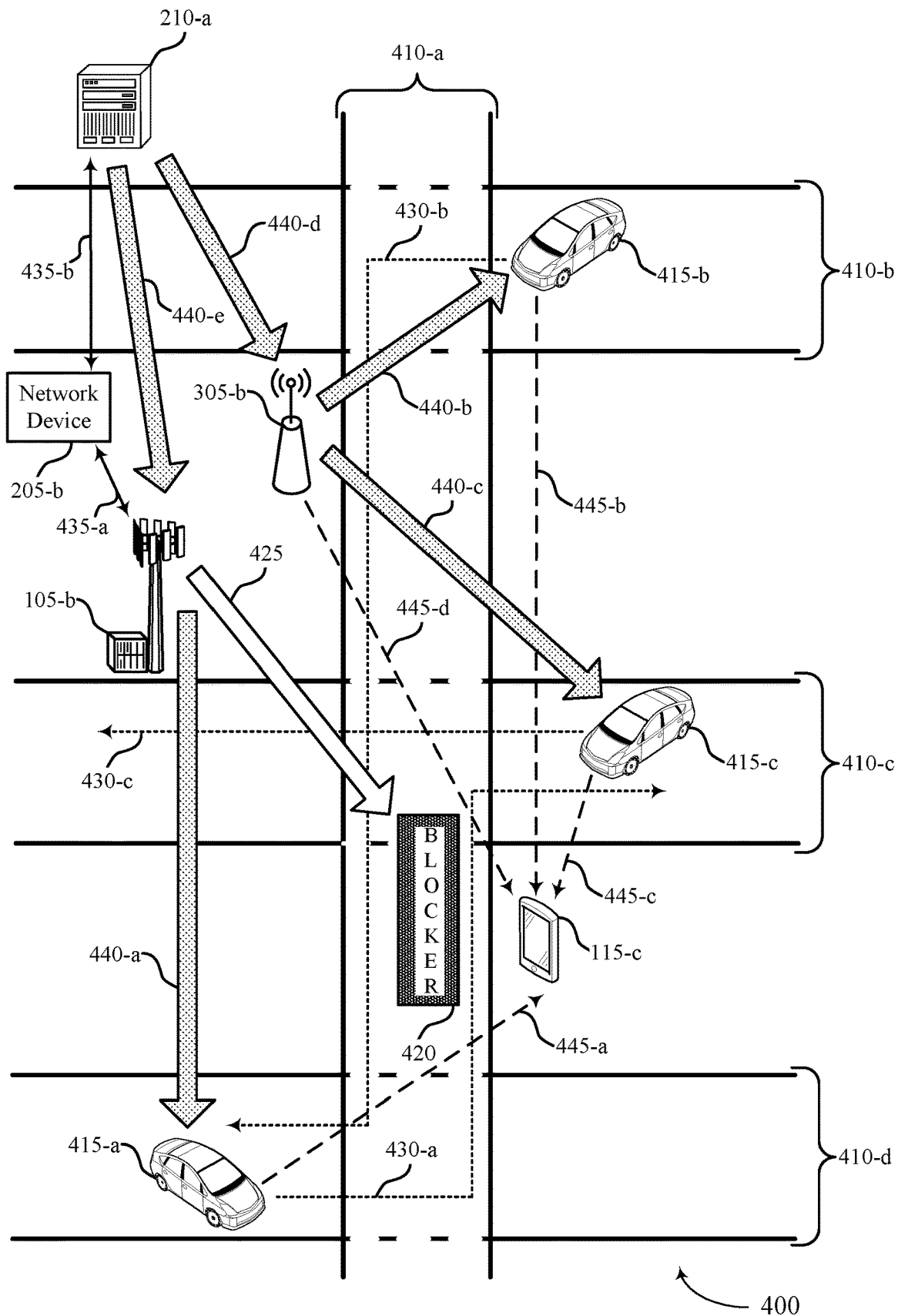

FIG. 4 illustrates an example of a wireless communications system 400 that supports techniques for managing wireless analytics in sidelink communications in accordance with various aspects of the present disclosure. In some examples, the wireless communications system 400 may implement aspects of the wireless communications system 100, the wireless communications system 200, and the wireless communications system 300. For instance, the wireless communications system 400 may include a base station 105-b and a UE 115-c which may be examples of the corresponding devices described with reference to FIG. 1. Additionally, the wireless communications system 400 may include one or more UEs 315 which may be examples of a UE 115 associated with a mobile vehicle. The wireless communications system 400 may also include a network device 205-b which may be an example of the corresponding device described with reference to FIGS. 2 and 3. Additionally, the wireless communications system 400 may include an RSU 305-b which may be an example of the corresponding device described with reference to FIG. 3. In this example, the RSU 305-b may act as a node or a relay, however, it should be understood that the RSU 305-b may also perform the action of a UE as described herein. In some examples, the wireless communications system 400 may include an application server 210-a which may be an example of the corresponding device described with respect to FIG. 2. In some examples, the application server 210 may be operated by one or more owners or one or more operators of the fleet. In some other examples, the application server 210 may be operated by one or more mobile network operators, such as through one or more negotiated interfaces.

In some examples, the wireless communications system 400 may enable the application server 210-a to assist with control (e.g., management) of the base station 105-b in a geographic coverage area. For example, the network device 205-b may manage the base station 105-b which may serve the UE 115-c. In some cases, the network device 205-b may communicate with the base station 105-b via a communication link 435-a. The network device 205-b may use perceptive wireless analytics to control communications between the base station 105-b and the UE 115-c. In some cases, the network device 205-b may determine to utilize the application server 210-a to assist the network device 205-b in controlling communications between the base station 105-b and the UE 115-c. For example, a blocker 420 may be a vehicle traveling along a path (e.g., a path along a roadway 410-a) that may intersect the direct path between the UE 115-c and the base station 105-b. In such an example, signals transmitted from the base station 105-b (e.g., via an access link 425) may be obstructed or blocked, and the likelihood that the UE 115-c receives the transmitted signals may be low. In such an example, the network device 205-b may select the application server 210-a to assist the network device 205-b. In some cases, the application server 210-a may be one of multiple application servers 210 operating in the wireless communications system 400. In some cases, the network device 205-b may select the application server 210-a based on the location of the base station 105-b and the geographic coverage area of the application server 210-a. In some cases, the network device 205-b may determine the application server 210-a using an address resolution protocol (e.g., a domain name system (DNS) protocol).

In some examples, the network device 205-b may transmit a request to the application server 210-a via a communication link 435-b. In some cases, the request may include a location of one or more base stations to be managed (e.g., the base station 105-b), a cell ID of the base station 105-b, a location of a UE being served by the base station 105-b (e.g., a location of the UE 115-c), a mobility history (e.g., a list of cell IDs or a list of wireless local area network (WLAN) SSIDs), and the device type (e.g., an internet of things (JOT) device, a wearable device, or a mobile device) of the UE 115-c. In some cases, based on the request, the application server 210-a may determine (e.g., select) one or more UEs 415 to participate in one or more operations associated with the UE 115-c. In some cases, the one or more operations may be associated with data collection regarding the status and location of the UE 115-c.

For example, the one or more operations may include identifying and tracking the UE 115-c. In some examples, one or more UEs 415 may be selected based on a path the vehicle may plan to travel. For example, a path of a UE 415-c (e.g., a path 430-c) may follow an intersecting roadway 410-c. As such, one or more of the network device 205-b or the application server 210-a may determine that the UE 415-c may be not be relevant to data collection associated with the UE 115-c. Additionally or alternatively, a path of a UE 415-a (e.g., a path 430-a) and a path of a UE 415-b (e.g., a path 430-b) may include the roadway 410-a and, therefore, one or more of the network device 205-b or the application server 210-a may determine that the UE 415-a and the UE 415-b are relevant to data collection associated with the UE 115-c. Accordingly, one or more of the network device 205-b or the application server 210-a may select the UE 415-a and the UE 415-b to identify and track the UE 115-c. Additionally or alternatively, one or more UEs 415 may be selected based on the capabilities (e.g., the viewing angle of sensors and the type of sensors) of the vehicle associated with the UEs 415.

In some examples, one or more of the network device 205-b or the application server 210-a may transmit one or more signals (e.g., control signaling) to the UEs 415 (e.g., to each of the selected UEs 415). In some cases, the control signaling may indicate that the UE 415 may be selected to identify and track the UE 115-c. One or more of the network device 205-b or the application server 210-a may inform selected UEs 415 to identify and track the UE 115-c. In some examples, one or more of the network device 205-b or the application server 210-a may transmit the control signaling using an access link (e.g., via a Uu interface) or using a sidelink (e.g., via a PC5 interface). In some cases, one or more of the network device 205-b or the application server 210-a may communicate with the UEs 415 via an RSU (e.g., the RSU 305-b). For example, one or more of the network device 205-b or the application server 210-a may transmit one or more signals (e.g., the control signaling) to the RSU 305-b via a communication link 440 (e.g., a communication link 440-d via a Uu interface). In response, the RSU 305-b may transmit one or more signals (e.g., the control signaling) to one or more UEs 415 via communication links 440 (e.g., via a PC5 interface). In some cases, the control signaling transmitted to one or more UEs 415 may indicate a cell ID of the UE 115-c or other information obtained by one or more of the network device 205-b or the application server 210-a regarding a location of the UE 115-c.

In some cases, location information provided by one or more of the network device 205-b or the application server 210-a may be insufficient to determine a physical location (e.g., a geolocation) of the UE 115-c. In such cases, the UEs 415 may identify the UE 115-c based on detecting (e.g., identifying) objects relevant to the UE 115-c, for example humans. In some cases, the UEs 415 may determine the identity of a relevant object based on determining that other candidate objects (e.g., other objects located in a geographic coverage area) are not relevant. For example, the control signaling may indicate that the base station 105-b may not be in the line of sight of the UE 115-c. In such an example, the UEs 415 may determine that objects which are in the line of sight of the base station 105-b may not be relevant objects. Additionally or alternatively, the UEs 415 may determine the identity of the UE 115-c by requesting further characteristics of the UE 115-c from one or more of the network device 205-b or the application server 210-a. Additionally or alternatively, the UEs 415 may determine the identity of the UE 115-c by transmitting a communication (e.g., via a sidelink) to the UE 115-c requesting that the UE 115-c transmit location information to the UEs 415. Additionally or alternatively, the UEs 415 may determine the identity of the UE 115-c by preforming dynamic sidelink ranging operations.

In some examples, the UEs 415 may perform cooperative perceptive wireless operations based on being selected by one or more of the network device 205-b or the application server 210-a. For example, one or more of the network device 205-b or the application server 210-a may instruct selected UEs 415 (e.g., the UE 415-a and the UE 415-b) to form a group. In some cases, group formation may be temporary. In some cases, the UE 415-a and the UE 415-b may then perform sensor sharing operations to track the UE 115-c. In some cases, sensor sharing operations may occur via a Uu interface or a PC5 interface (e.g., in a C-V2X system). In some instances, cooperative perceptive wireless many enable the UEs 415 to track the UE 115-c in different locations. The UEs 415 participating in a group may provide information that covers potential paths of the UE 115-c.

In some examples, multiple UEs 415 may provide coordination information directly to one or more of the network device 205-b or the application server 210-a or indirectly to one or more of the network device 205-b or the application server 210-a. In some examples, the UEs 415 may use sensors (e.g., cameras) to identify blockages, determine potential blockages, and determine the duration of time a potential blockage may occur. In some examples determining the duration of time a blockage may occur may enable the network device 205-b to determine a length of time that service may be interrupted. In such cases, the network device 205-b may reschedule transmissions to avoid service interruptions. In some cases, the UEs 415 may determine whether a path may be available (e.g., and the time duration in which the path may be available) based on the strength of signals reflected off objects in the geographic coverage area. In some examples the UEs 415 may determine potential blockage by estimating the channel along a path the UE 115-c may travel prior to the UE 115-c traveling along the path.

In some examples, characteristics (e.g., modules and software) of the UEs 415 may be dynamically updated. For example, module or software of a selected UE 415 may be updated based on the characteristics of the UE 115-c and the surrounding environment. In some cases, characteristics of a UE 415 may be updated to improve communications with the UE 115-c. In some cases, the network device 205-b may transmit updates for the UEs 415 via one or more of the network device 205-b or the application server 210-a in response to one or more of the network device 205-b or the application server 210-a transmitting a list of the UEs 415 to the network device 205-b. In some other cases, the network device 205-b may transmit updates for the UEs 415 via the RSU 305-b. In some instances, update indications may be transmitted (e.g., relayed) between the UEs 415 (e.g., the UEs 415 which have formed a group). In some examples, characteristics (e.g., modules and software) of a UE 415 may be used to track the UE 115-c, perform measurements associated with the UE 115, and perform channel estimation.

In some examples, the UEs 415 may preform dynamic sidelink ranging operations to identify and track the UE 115-c. In some cases, dynamic sidelink ranging operations may enable the network device 205-b to increase the accuracy in which the position of the UE 115-c may be determined. In some instances, increasing the accuracy in which the position of the UE 115-c may be determined may improve beam management, among other benefits. In some cases, one or more UEs 415 may form a group to enable dynamic sidelink ranging operations. In some cases, coordination of dynamic sidelink ranging operations (e.g., resource allocation, positioning reference signal (PRS) transmission management, and results sharing) may be communicated via communication links 445 (e.g., via a PC5 interface, a Uu interface, or combination thereof). In some examples, dynamic sidelink ranging operations may be managed by the network device 205-b or by the group of UEs 415. In some examples, the UEs 415 may be scheduled to participate in dynamic sidelink ranging operations based on the estimated path of the UEs 415. In some cases, the UEs 415 may be scheduled to participate in dynamic ranging operations when the UEs 415 are within a distance of the UE 115-c.

Figure 5:
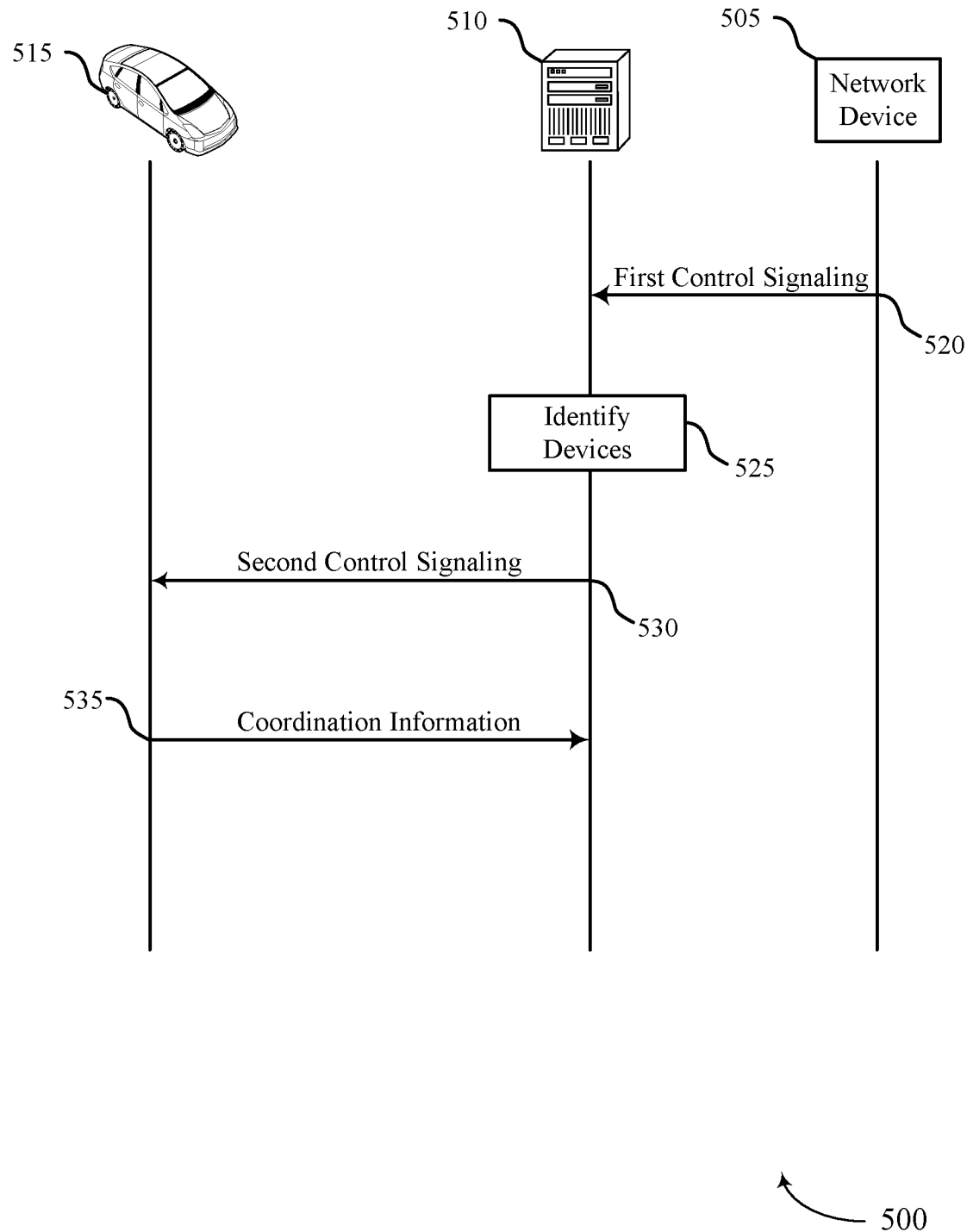
FIGS. 5 and 6 illustrate examples of process flows that support techniques for managing wireless analytics in sidelink communications in accordance with various aspects of the present disclosure.

FIG. 5 illustrates an example of a process flow 500 supports techniques for managing wireless analytics in sidelink communications in accordance with various aspects of the present disclosure. The process flow 500 may implement aspects of the wireless communications systems 100 and 200 or may be implemented by aspects of the wireless communications systems 100 and 200 as described with reference to FIGS. 1 and 2, respectively. For example, the process flow 500 may include a network device 505, an application server 510, and a UE 515, which may be examples of a network entity (e.g., a base station, network control node, among other examples) and a UE as described with reference to FIGS. 1 through 4. In the following description of the process flow 500, the operations between the network device 505, the application server 510, and the UE 515 may be performed in different orders or at different times. Some operations may also be omitted from the process flow 500, and other operations may be added to the process flow 500.

At 520, the network device 505 may transmit, and the application server 510 may receive, first control signaling (e.g., an RRC message, a DCI, a MAC-CE, or other control signaling) indicating a target device (e.g., a target UE) in a wireless communications system. At 525, the application server 510 may identify, based on the received first control signaling, a set of devices (e.g., one or more vehicles) for tracking the target device in the wireless communications system. At 530, the application server 510 may transmit second control signaling to set of devices (e.g., one or more vehicles) including the UE 515 for tracking the target device in the wireless communications system. At 535, the application server 510 may receive, from the UE 515, coordination information associated with the target device based on the transmitted second control signaling. The coordination information may be used by the network device 605 to predict changes in an environment surrounding the target device. By managing dynamic changes in the environment, interruptions in wireless communication may be prevented.

Figure 6:
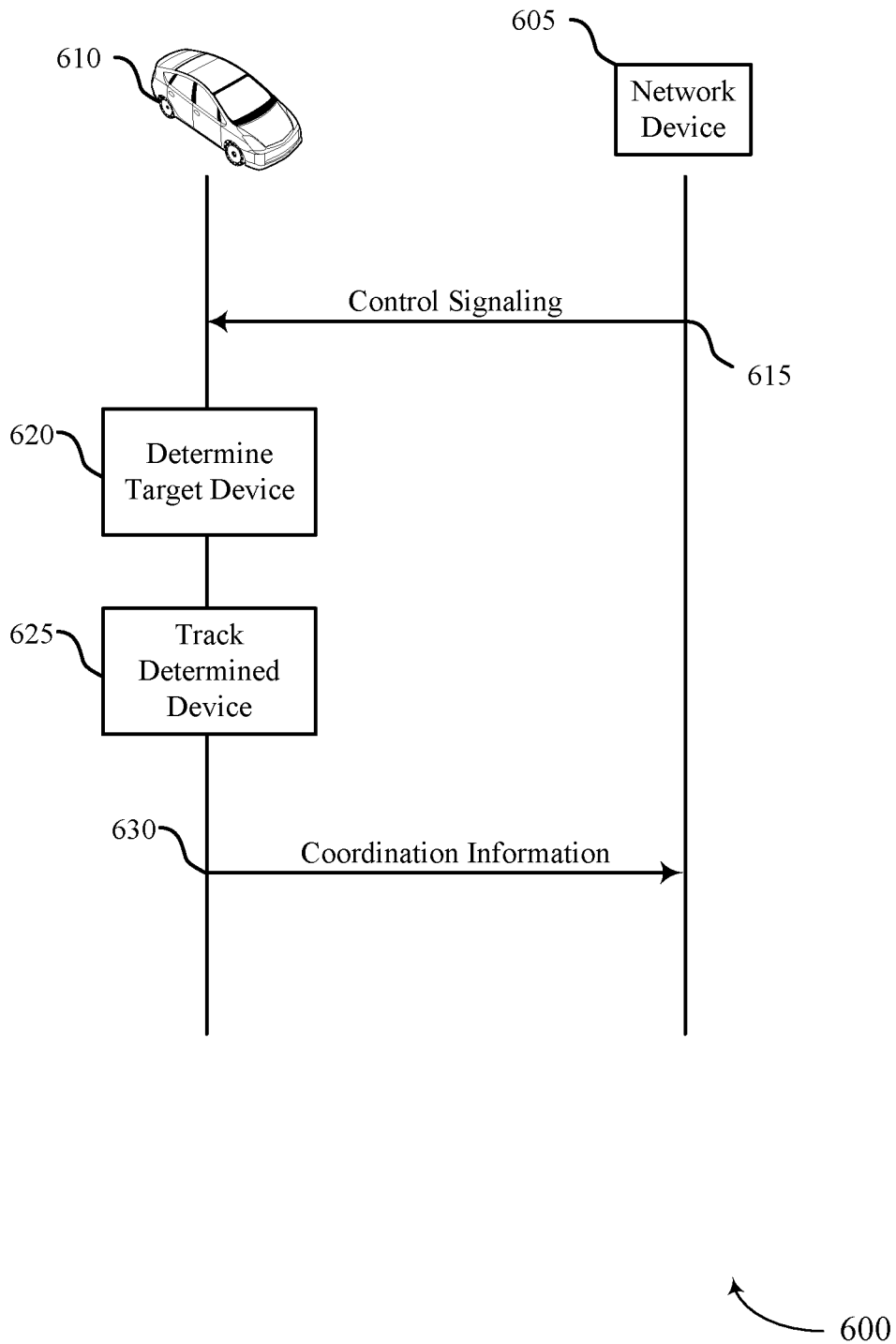

FIG. 6 illustrates an example of a process flow 600 that supports techniques for managing wireless analytics in sidelink communications in accordance with various aspects of the present disclosure. The process flow 600 may implement aspects of the wireless communications systems 100 and 200 or may be implemented by aspects of the wireless communications systems 100 and 200 as described with reference to FIGS. 1 and 2, respectively. For example, the process flow 600 may include a network device 605 and a UE 610, which may be examples of a network entity (e.g., a base station, an application server, among other examples) and a UE as described with reference to FIGS. 1 through 5. In the following description of the process flow 600, the operations between the network device 605 and the UE 615 may be performed in different orders or at different times. Some operations may also be omitted from the process flow 600, and other operations may be added to the process flow 600.

At 615, the network device 605 may transmit, to the UE 610, control signaling (e.g., an RRC message, or other control signaling) to enable the UE 610 to track a target device in a wireless communications system. For example, the UE 610 may be a vehicle in a C-V2X system, and the target device may be a UE in wireless communication with a base station in the wireless communications system. The control signaling may include an indication of the target device in the wireless communications system as described herein. At 620, the UE 610 may determine the target device in the wireless communications system based on the received control signaling. At 625, the UE 610 may track the determined target device in the wireless communications system, and collect coordination information associated with the target device as described herein. At 630, the UE 615 may transmit, to the network device 605, the coordination information associated with the target device based on the tracking. The coordination information may be used by the network device 605 to predict changes in an environment surrounding the target device. By predicting dynamic changes in the environment, disruptions in wireless communication may be prevented.

Figure 7:
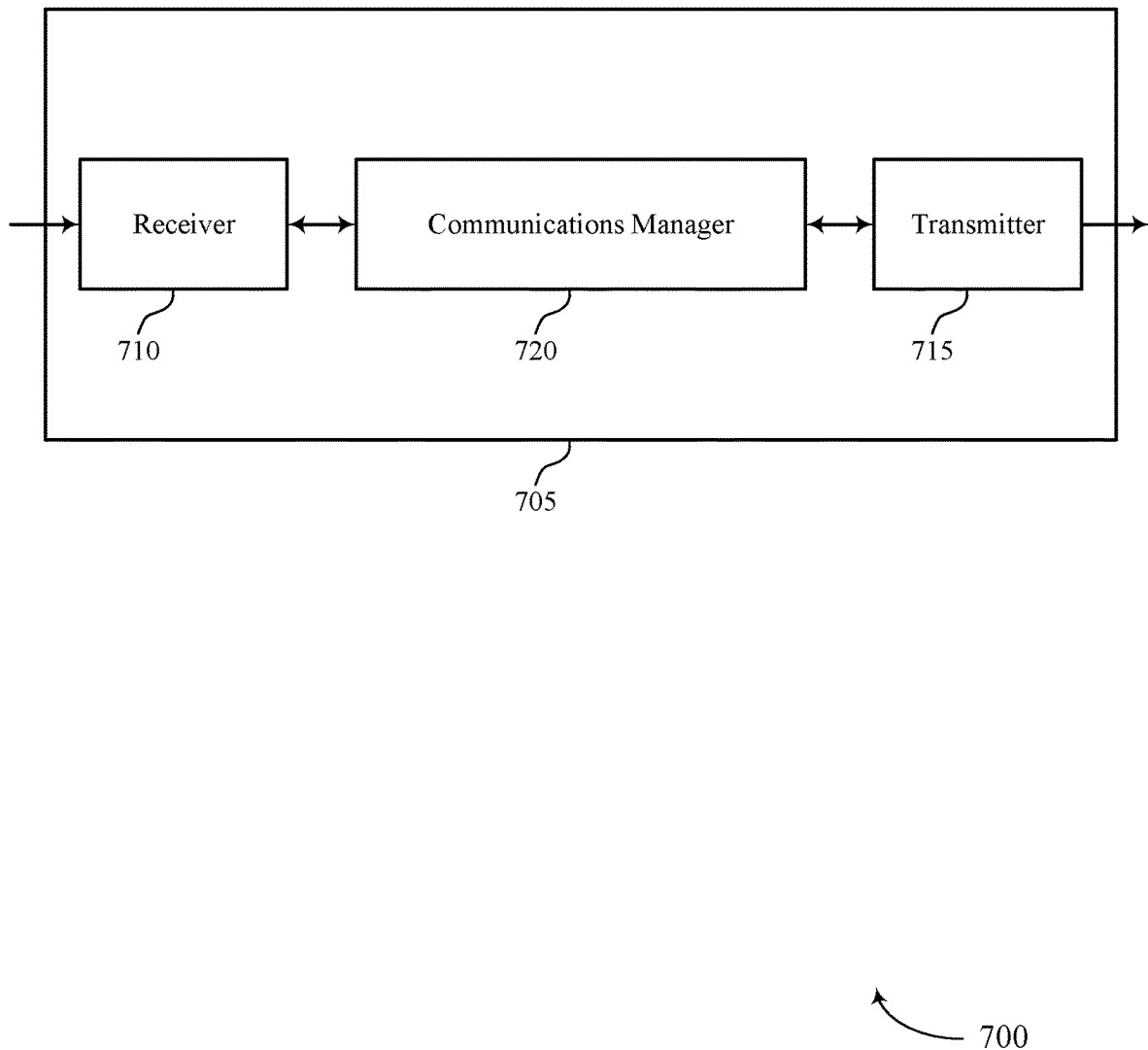
FIGS. 7 and 8 show block diagrams of devices that support techniques for managing wireless analytics in sidelink communications in accordance with various aspects of the present disclosure.

FIG. 7 shows a block diagram 700 of a device 705 that supports techniques for managing wireless analytics in sidelink communications in accordance with various aspects of the present disclosure. The device 705 may be an example of aspects of a network entity as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for managing wireless analytics in sidelink communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for managing wireless analytics in sidelink communications). In some examples, the transmitter 715 may be co-located with a receiver 710 in a transceiver. The transmitter 715 may utilize a single antenna or a set of multiple antennas.

The communications manager 720, the receiver 710, the transmitter 715, or various combinations thereof or various components thereof may be examples of means for performing various aspects of techniques for managing wireless analytics in sidelink communications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first device (e.g., the device 705) in accordance with examples as disclosed herein. For example, the communications manager 720 may be configured as or otherwise support a means for receiving first control signaling indicating a second device in a wireless communications system. The communications manager 720 may be configured as or otherwise support a means for identifying, based on the received first control signaling, a set of devices for tracking the second device in the wireless communications system. The communications manager 720 may be configured as or otherwise support a means for transmitting second control signaling to the set of devices for tracking the second device in the wireless communications system. The communications manager 720 may be configured as or otherwise support a means for receiving, from the set of devices, coordination information associated with the second device based on the transmitted second control signaling.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for more efficient utilization of communication resources.

Figure 8:
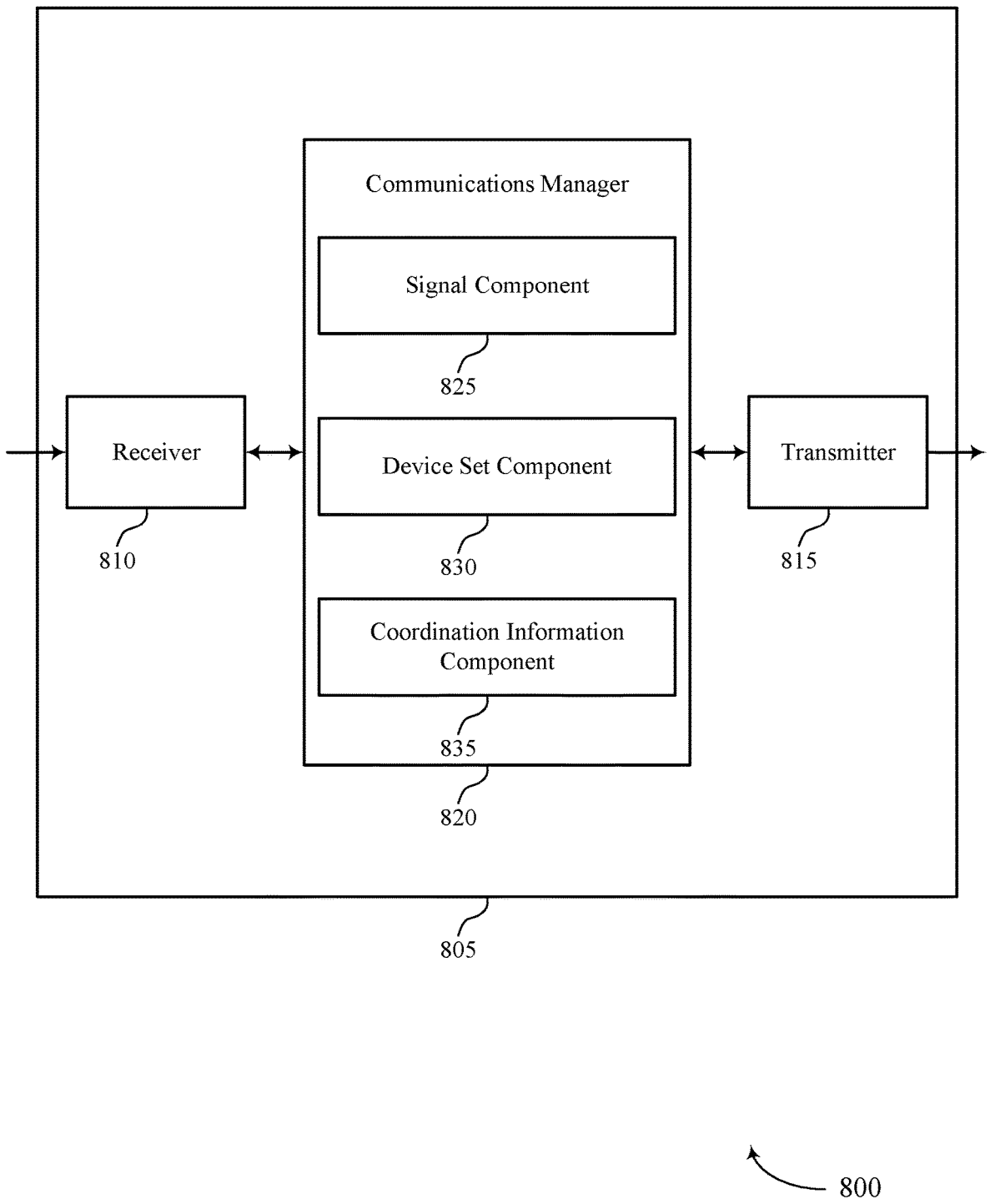

FIG. 8 shows a block diagram 800 of a device 805 that supports techniques for managing wireless analytics in sidelink communications in accordance with various aspects of the present disclosure. The device 805 may be an example of aspects of a device 705 or a network entity (e.g., an application server) as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for managing wireless analytics in sidelink communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for managing wireless analytics in sidelink communications). In some examples, the transmitter 815 may be co-located with a receiver 810 in a transceiver. The transmitter 815 may utilize a single antenna or a set of multiple antennas.

The device 805, or various components thereof, may be an example of means for performing various aspects of techniques for managing wireless analytics in sidelink communications as described herein. For example, the communications manager 820 may include a signal component 825, a device set component 830, a coordination information component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first device (e.g., the device 805) in accordance with examples as disclosed herein. The signal component 825 may be configured as or otherwise support a means for receiving first control signaling indicating a second device in a wireless communications system. The device set component 830 may be configured as or otherwise support a means for identifying, based on the received first control signaling, a set of devices for tracking the second device in the wireless communications system. The signal component 825 may be configured as or otherwise support a means for transmitting second control signaling to the set of devices for tracking the second device in the wireless communications system. The coordination information component 835 may be configured as or otherwise support a means for receiving, from the set of devices, coordination information associated with the second device based on the transmitted second control signaling.

Figure 9:
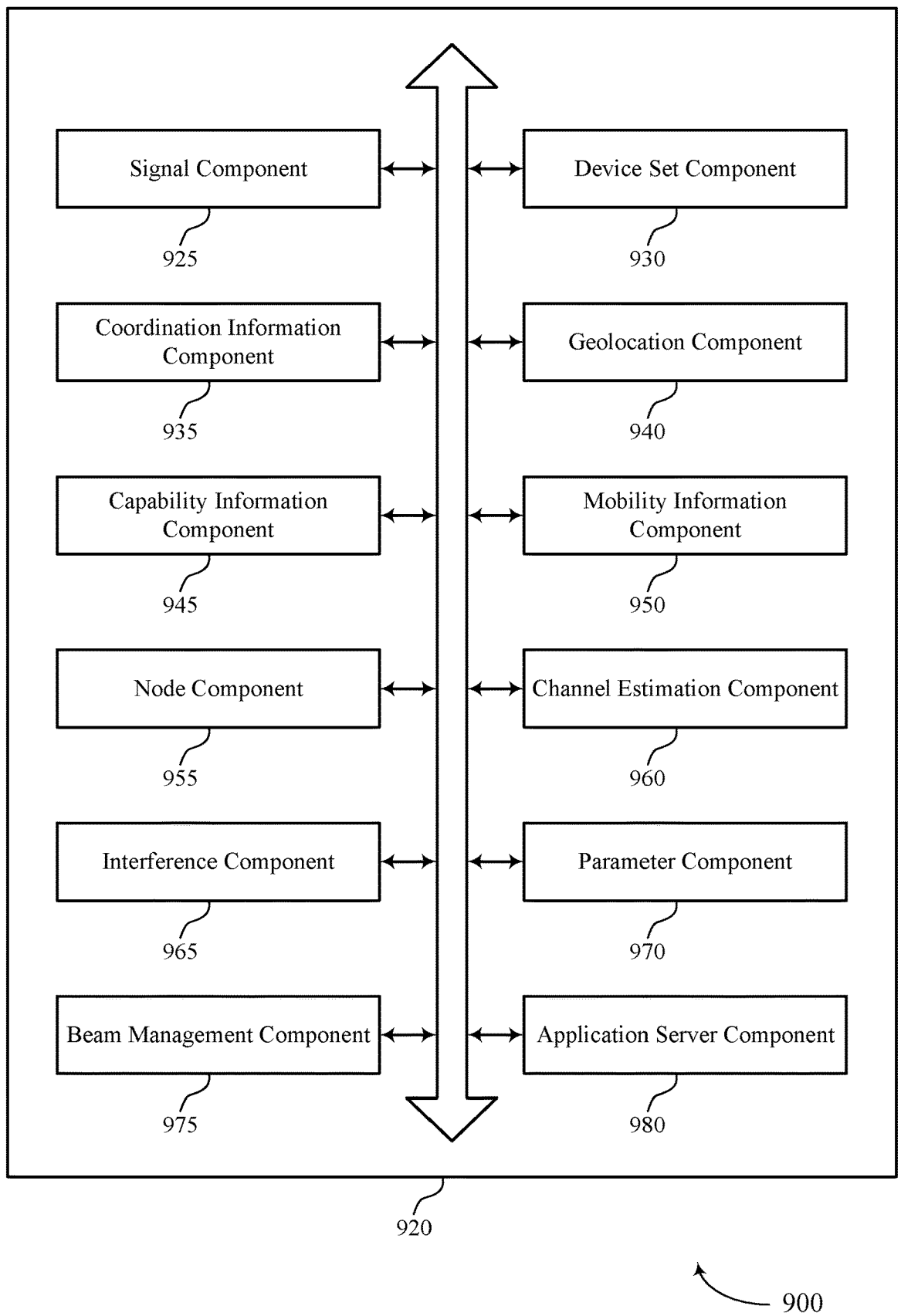
FIG. 9 shows a block diagram of a communications manager that supports techniques for managing wireless analytics in sidelink communications in accordance with various aspects of the present disclosure.

FIG. 9 shows a block diagram 900 of a communications manager 920 that supports techniques for managing wireless analytics in sidelink communications in accordance with various aspects of the present disclosure. The communications manager 920 may be an example of aspects of a communications manager 720, a communications manager 820, or both, as described herein. The communications manager 920, or various components thereof, may be an example of means for performing various aspects of techniques for managing wireless analytics in sidelink communications as described herein. For example, the communications manager 920 may include a signal component 925, a device set component 930, a coordination information component 935, a geolocation component 940, a capability information component 945, a mobility information component 950, a node component 955, a channel estimation component 960, an interference component 965, a parameter component 970, a beam management component 975, an application server component 980, or any combination thereof. Each of these components may communicate, directly or indirectly, with one another (e.g., via one or more buses).

The communications manager 920 may support wireless communication at a first device in accordance with examples as disclosed herein. The signal component 925 may be configured as or otherwise support a means for receiving first control signaling indicating a second device in a wireless communications system. The device set component 930 may be configured as or otherwise support a means for identifying, based on the received first control signaling, a set of devices for tracking the second device in the wireless communications system. In some examples, the signal component 925 may be configured as or otherwise support a means for transmitting second control signaling to the set of devices for tracking the second device in the wireless communications system. The coordination information component 935 may be configured as or otherwise support a means for receiving, from the set of devices, coordination information associated with the second device based on the transmitted second control signaling.

In some examples, the geolocation component 940 may be configured as or otherwise support a means for determining one or more of a geolocation or a cell identifier associated with a serving cell of the second device based at least in part on the received first control signaling, where identifying the set of devices for tracking the second device is based at least in part on one or more of the determined geolocation or the determined cell identifier associated with the serving cell of the second device. In some examples, the geolocation component 940 may be configured as or otherwise support a means for determining a geolocation and a mobility trace of the second device based at least in part on the received first control signaling, where identifying the set of devices for tracking the second device is based at least in part on the geolocation and the mobility trace of the second device.

In some examples, the capability information component 945 may be configured as or otherwise support a means for determining capability information associated with each device of the set of devices. In some examples, the device set component 930 may be configured as or otherwise support a means for selecting the set of devices for tracking the second device based at least in part on the determined capability information. In some examples, transmitting the second control signaling is based at least in part on selecting the set of devices for tracking the second device.

In some examples, the mobility information component 950 may be configured as or otherwise support a means for determining mobility information associated with each device of the set of devices, the determined mobility information indicating an estimated route of each device of the set of devices in the wireless communications system. In some examples, the device set component 930 may be configured as or otherwise support a means for selecting the set of devices for tracking the second device based on the determined mobility information. In some examples, transmitting the second control signaling is based on selecting the set of devices for tracking the second device.

In some examples, the node component 955 may be configured as or otherwise support a means for selecting a node in the wireless communications system for communicating the second control signaling based on a geolocation of one or more devices of the set of devices. The selected node including an RSU or a base station. In some examples, transmitting the second control signaling to the set of devices is based on the selected node in the wireless communications system. In some examples, the second control signaling includes a service type parameter indicating one or more of a provider service identifier, an intelligent transportation system application identifier, or an application identifier.

In some examples, the signal component 925 may be configured as or otherwise support a means for transmitting, to the second device, third control signaling to enable a sidelink ranging operation, where tracking the second device is based on the sidelink ranging operation.

In some examples, the signal component 925 may be configured as or otherwise support a means for transmitting third control signaling requesting the second device to measure one or more metrics associated with sidelink communications over a sidelink. In some examples, the signal component 925 may be configured as or otherwise support a means for receiving fourth control signaling including a report of one or more of the reference signal received power (RSRP) or the reference signal strength indicator (RSSI), where the second control signaling includes an indication of the one or more metrics associated with the sidelink communication identifying the second device in the wireless communications system. In some examples, the one or more metrics may include an RSRP, an RSSI, or a combination thereof.

In some examples, the signal component 925 may be configured as or otherwise support a means for transmitting, in the second control signaling, an indication for the set of devices to form a group for tracking the second device in the wireless communications system, the set of devices in the formed group sharing sensing information over a sidelink for tracking the second device. In some examples, the channel estimation component 960 may be configured as or otherwise support a means for determining channel estimation associated with the second device in the wireless communications system based on the received coordination information. In some examples, the signal component 925 may be configured as or otherwise support a means for performing the wireless communication with the second device based on the determined channel estimation associated with the second device.

In some examples, the interference component 965 may be configured as or otherwise support a means for determining interference information associated with the second device in the wireless communications system based on the received coordination information. In some examples, the signal component 925 may be configured as or otherwise support a means for performing the wireless communication with the second device based on the determined interference information associated with the second device. In some examples, the parameter component 970 may be configured as or otherwise support a means for updating the set of devices with one or more parameters for tracking the second device based on the received first control signaling, the one or more parameters corresponding to network conditions associated with the second device, where identifying the set of devices for tracking the second device is based on the updating.

In some examples, the beam management component 975 may be configured as or otherwise support a means for performing one or more of a beam management operation or a resource allocation operation based on the received coordination information. In some examples, the first device includes a V2X application server. In some examples, the wireless communications system includes a C-V2X system. In some examples, the set of devices includes a set of vehicles. In some examples, the second device includes a UE.

Figure 10:
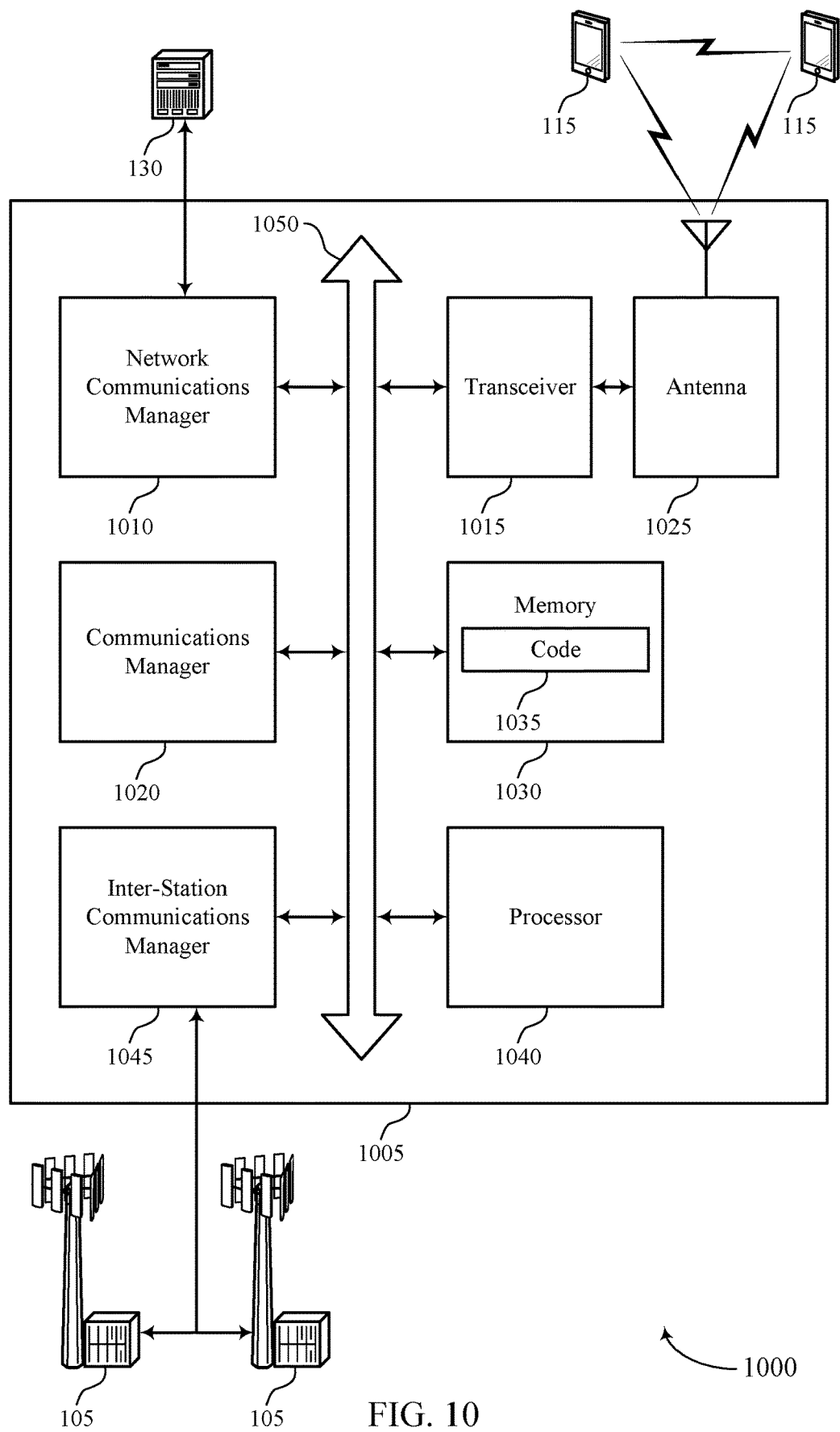
FIG. 10 shows a diagram of a system including a device that supports techniques for managing wireless analytics in sidelink communications in accordance with various aspects of the present disclosure.

FIG. 10 shows a diagram of a system 1000 including a device 1005 that supports techniques for managing wireless analytics in sidelink communications in accordance with various aspects of the present disclosure. The device 1005 may be an example of or include the components of a device 705, a device 805, or an application server as described herein. The device 1005 may include components for bi-directional voice and data communications including components for transmitting and receiving communications, such as a communications manager 1020, a network communications manager 1010, a transceiver 1015, an antenna 1025, a memory 1030, code 1035, a processor 1040, and an inter-station communications manager 1045. These components may be in electronic communication or otherwise coupled (e.g., operatively, communicatively, functionally, electronically, electrically) via one or more buses (e.g., a bus 1050).

The network communications manager 1010 may manage communications with a core network 130 (e.g., via one or more wired backhaul links). For example, the network communications manager 1010 may manage the transfer of data communications for client devices, such as one or more UEs 115.

In some cases, the device 1005 may include a single antenna 1025. However, in some other cases the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025.

The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for managing wireless analytics in sidelink communications). For example, the device 1005 or a component of the device 1005 may include a processor 1040 and memory 1030 coupled to the processor 1040, the processor 1040 and memory 1030 configured to perform various functions described herein.

The inter-station communications manager 1045 may manage communications with other base stations 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communications network technology to provide communication between base stations 105.

The communications manager 1020 may support wireless communication at a first device (e.g., the device 1005) in accordance with examples as disclosed herein. For example, the communications manager 1020 may be configured as or otherwise support a means for receiving first control signaling indicating a second device in a wireless communications system. The communications manager 1020 may be configured as or otherwise support a means for identifying, based on the received first control signaling, a set of devices for tracking the second device in the wireless communications system. The communications manager 1020 may be configured as or otherwise support a means for transmitting second control signaling to the set of devices for tracking the second device in the wireless communications system. The communications manager 1020 may be configured as or otherwise support a means for receiving, from the set of devices, coordination information associated with the second device based on the transmitted second control signaling.

By including or configuring the communications manager 1020 in accordance with examples as described herein, the device 1005 may support techniques for improved communication reliability, reduced latency, improved user experience related to reduced processing, more efficient utilization of communication resources, improved coordination between devices, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for managing wireless analytics in sidelink communications as described herein, or the processor 1040 and the memory 1030 may be otherwise configured to perform or support such operations.

Figure 11:
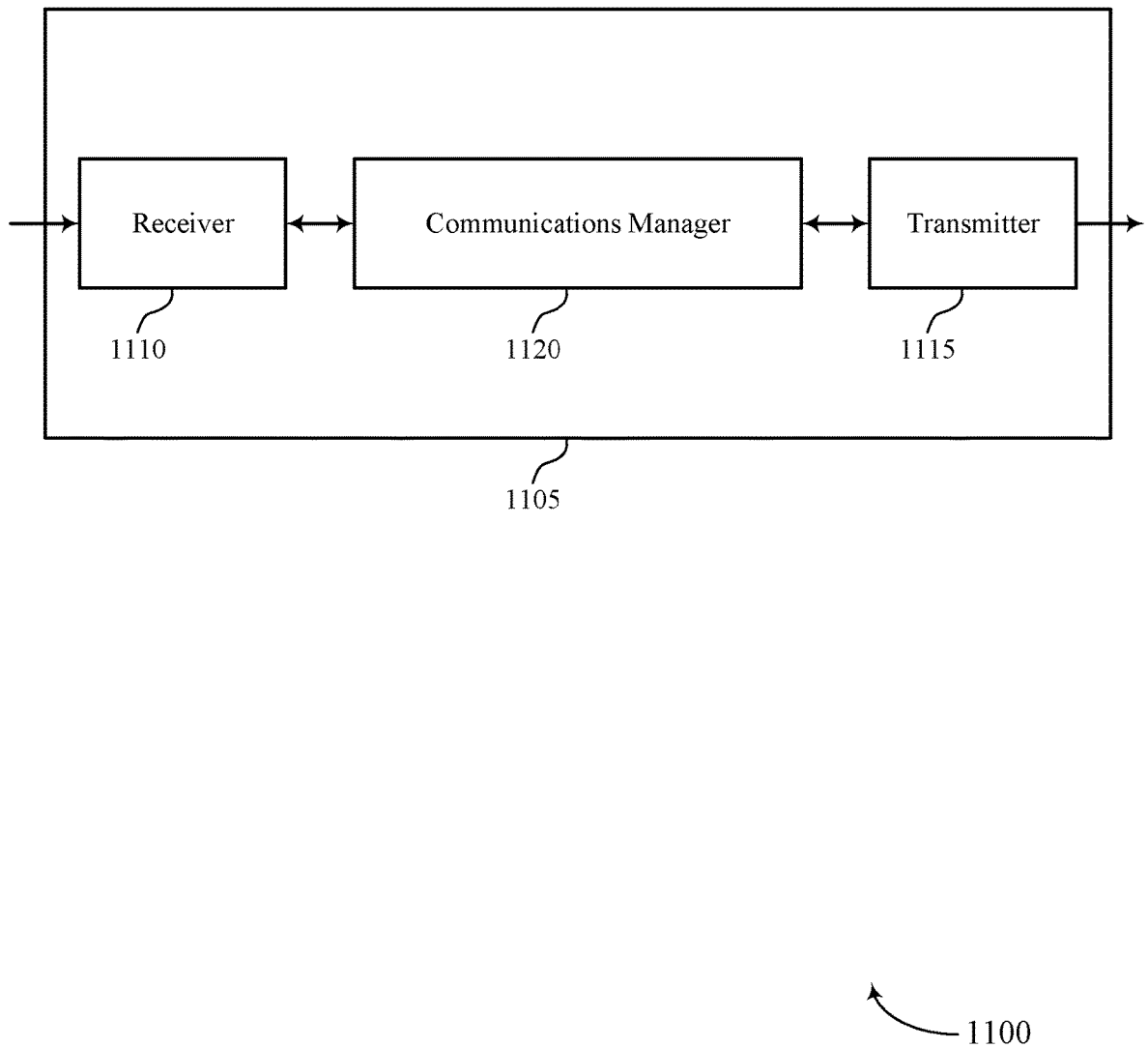
FIGS. 11 and 12 show block diagrams of devices that support techniques for managing wireless analytics in sidelink communications in accordance with various aspects of the present disclosure.

FIG. 11 shows a block diagram 1100 of a device 1105 that supports techniques for managing wireless analytics in sidelink communications in accordance with various aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for managing wireless analytics in sidelink communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for managing wireless analytics in sidelink communications). In some examples, the transmitter 1115 may be co-located with a receiver 1110 in a transceiver. The transmitter 1115 may utilize a single antenna or a set of multiple antennas.

The communications manager 1120, the receiver 1110, the transmitter 1115, or various combinations thereof or various components thereof may be examples of means for performing various aspects of techniques for managing wireless analytics in sidelink communications as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a first device (e.g., the device 1105) in accordance with examples as disclosed herein. For example, the communications manager 1120 may be configured as or otherwise support a means for receiving, from a network device, first control signaling indicating a second device in a wireless communications system. The communications manager 1120 may be configured as or otherwise support a means for identifying, based on the received first control signaling, the second device in the wireless communications system. The communications manager 1120 may be configured as or otherwise support a means for tracking the second device using a set of resources associated with the first device. The communications manager 1120 may be configured as or otherwise support a means for transmitting, to the network device, coordination information associated with the second device based on the tracking.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for more efficient utilization of communication resources.

Figure 12:
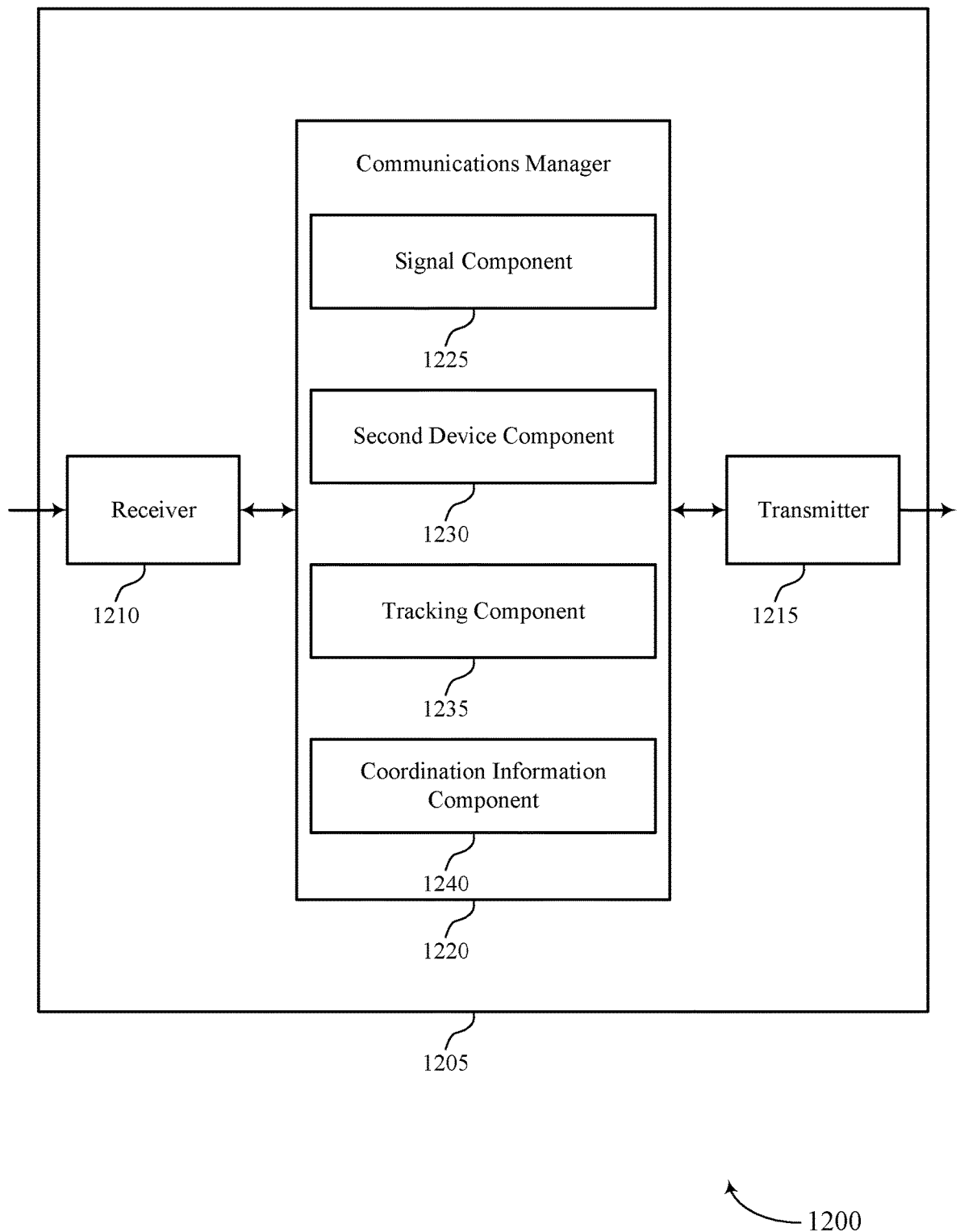

FIG. 12 shows a block diagram 1200 of a device 1205 that supports techniques for managing wireless analytics in sidelink communications in accordance with various aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for managing wireless analytics in sidelink communications). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for managing wireless analytics in sidelink communications). In some examples, the transmitter 1215 may be co-located with a receiver 1210 in a transceiver. The transmitter 1215 may utilize a single antenna or a set of multiple antennas.

The device 1205, or various components thereof, may be an example of means for performing various aspects of techniques for managing wireless analytics in sidelink communications as described herein. For example, the communications manager 1220 may include a signal component 1225, a second device component 1230, a tracking component 1235, a coordination information component 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a first device (e.g., the device 1205) in accordance with examples as disclosed herein. The signal component 1225 may be configured as or otherwise support a means for receiving, from a network device, first control signaling indicating a second device in a wireless communications system. The second device component 1230 may be configured as or otherwise support a means for identifying, based on the received first control signaling, the second device in the wireless communications system. The tracking component 1235 may be configured as or otherwise support a means for tracking the second device using a set of resources associated with the first device. The coordination information component 1240 may be configured as or otherwise support a means for transmitting, to the network device, coordination information associated with the second device based on the tracking.

Figure 13:
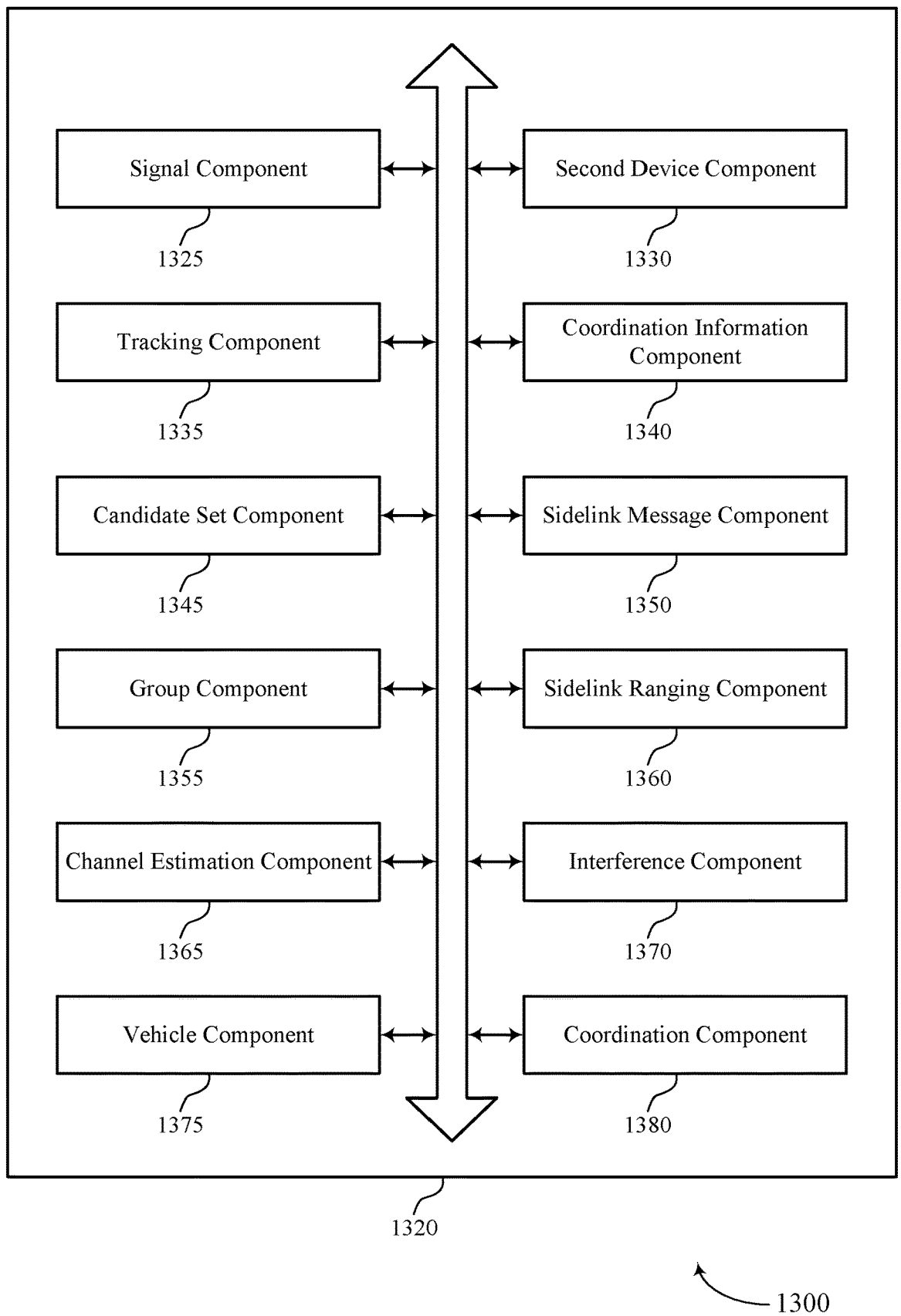
FIG. 13 shows a block diagram of a communications manager that supports techniques for managing wireless analytics in sidelink communications in accordance with various aspects of the present disclosure.

FIG. 13 shows a block diagram 1300 of a communications manager 1320 that supports techniques for managing wireless analytics in sidelink communications in accordance with various aspects of the present disclosure. The communications manager 1320 may be an example of aspects of a communications manager 1120, a communications manager 1220, or both, as described herein. The communications manager 1320, or various components thereof, may be an example of means for performing various aspects of techniques for managing wireless analytics in sidelink communications as described herein. For example, the communications manager 1320 may include a signal component 1325, a second device component 1330, a tracking component 1335, a coordination information component 1340, a candidate set component 1345, a sidelink message component 1350, a group component 1355, a sidelink ranging component 1360, a channel estimation component 1365, an interference component 1370, a vehicle component 1375, a coordination component 1380, or any combination thereof. Each of these components may communicate, directly or indirectly, with one another (e.g., via one or more buses).

The communications manager 1320 may support wireless communication at a first device in accordance with examples as disclosed herein. The signal component 1325 may be configured as or otherwise support a means for receiving, from a network device, first control signaling indicating a second device in a wireless communications system. The second device component 1330 may be configured as or otherwise support a means for identifying, based on the received first control signaling, the second device in the wireless communications system. The tracking component 1335 may be configured as or otherwise support a means for tracking the second device using a set of resources associated with the first device. The coordination information component 1340 may be configured as or otherwise support a means for transmitting, to the network device, coordination information associated with the second device based on the tracking.

In some examples, the candidate set component 1345 may be configured as or otherwise support a means for identifying a set of candidate second devices in the wireless communications system. In some examples, the second device component 1330 may be configured as or otherwise support a means for selecting the second device from the set of candidate second devices based on information associated with the second device. In some examples, identifying the second device in the wireless communications system is based on the selecting. In some examples, the signal component 1325 may be configured as or otherwise support a means for transmitting second control signaling requesting additional information associated with the second device based on a condition, the condition including an unsuccessful attempt to identify the second device. In some examples, the signal component 1325 may be configured as or otherwise support a means for receiving third control signaling indicating the additional information associated with the second device based on the transmitted second control signaling.

In some examples, the sidelink message component 1350 may be configured as or otherwise support a means for broadcasting a sidelink message to enable a sidelink ranging operation at the second device. In some examples, identifying the second device in the wireless communications system is based on the sidelink ranging operation. In some examples, the group component 1355 may be configured as or otherwise support a means for determining to form a group of devices for tracking the second device in the wireless communications system based on the received first control signaling, the set of devices in the formed group sharing sensing information over a sidelink for tracking the second device. In some examples, tracking the second device is based on the group of devices.

In some examples, the coordination component 1380 may be configured as or otherwise support a means for determining a sidelink ranging coordination between the group of devices based on the received first control signaling. In some examples, the sidelink ranging component 1360 may be configured as or otherwise support a means for performing a sidelink ranging operation based on the determined sidelink ranging coordination. In some examples, tracking the second device is based on the performed sidelink ranging operation. In some examples, the sidelink ranging component 1360 may be configured as or otherwise support a means for performing a sidelink ranging operation based on an estimated route of the first device and a geolocation of the second device in the wireless communications system. In some examples, tracking the second device is based on the performed sidelink ranging operation.

In some examples, the channel estimation component 1365 may be configured as or otherwise support a means for determining channel estimation associated with the second device in the wireless communications system based on tracking the second device. In some examples, the coordination information includes the determined channel estimation associated with the second device. In some examples, the interference component 1370 may be configured as or otherwise support a means for determining interference information associated with the second device in the wireless communications system based on tracking the second device. In some examples, the coordination information includes the determined interference information associated with the second device. In some examples, the first device includes a vehicle. In some examples, the wireless communications system includes a C-V2X system. In some examples, the second device includes a UE.

Figure 14:
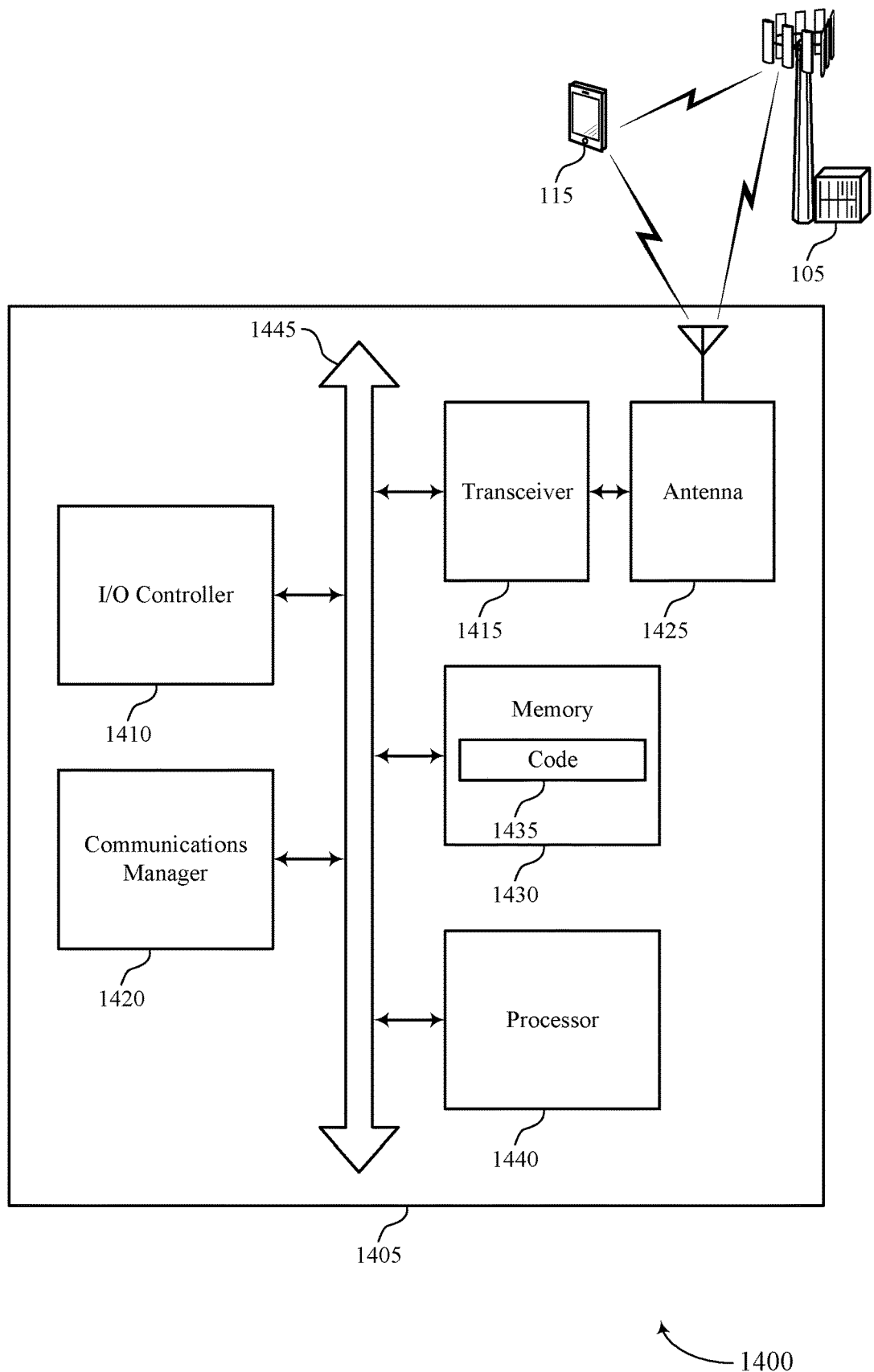
FIG. 14 shows a diagram of a system including a device that supports techniques for managing wireless analytics in sidelink communications in accordance with various aspects of the present disclosure.

FIG. 14 shows a diagram of a system 1400 including a device 1405 that supports techniques for managing wireless analytics in sidelink communications in accordance with various aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for managing wireless analytics in sidelink communications). For example, the device 1405 or a component of the device 1405 may include a processor 1440 and memory 1430 coupled to the processor 1440, the processor 1440 and memory 1430 configured to perform various functions described herein.

The communications manager 1420 may support wireless communication at a first device (e.g., the device 1405) in accordance with examples as disclosed herein. For example, the communications manager 1420 may be configured as or otherwise support a means for receiving, from a network device, first control signaling indicating a second device in a wireless communications system. The communications manager 1420 may be configured as or otherwise support a means for identifying, based on the received first control signaling, the second device in the wireless communications system. The communications manager 1420 may be configured as or otherwise support a means for tracking the second device using a set of resources associated with the first device. The communications manager 1420 may be configured as or otherwise support a means for transmitting, to the network device, coordination information associated with the second device based on the tracking.

By including or configuring the communications manager 1420 in accordance with examples as described herein, the device 1405 may support techniques for improved communication reliability, reduced latency, improved user experience related to reduced processing, more efficient utilization of communication resources, improved coordination between devices, and improved utilization of processing capability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for managing wireless analytics in sidelink communications as described herein, or the processor 1440 and the memory 1430 may be otherwise configured to perform or support such operations.

Figure 15:
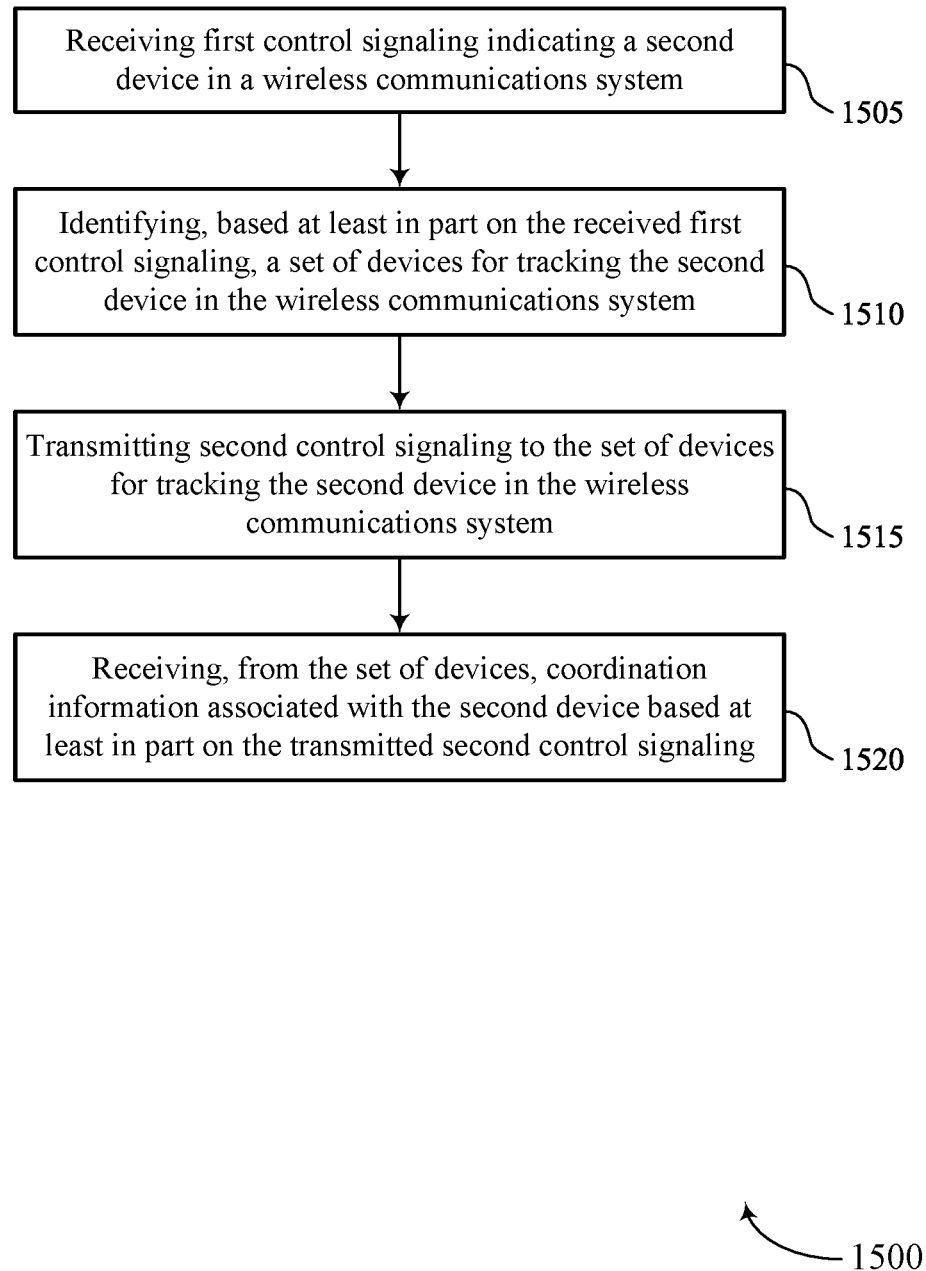
FIGS. 15 through 18 show flowcharts illustrating methods that support techniques for managing wireless analytics in sidelink communications in accordance with various aspects of the present disclosure.

FIG. 15 shows a flowchart illustrating a method 1500 that supports techniques for managing wireless analytics in sidelink communications in accordance with various aspects of the present disclosure. The operations of the method 1500 may be implemented by a device (e.g., a network entity, such as a base station, an application server, among other examples) or its components as described herein. For example, the operations of the method 1500 may be performed by device as described with reference to FIGS. 1 through 10. In some examples, a device may execute a set of instructions to control the functional elements of the device to perform the described functions. Additionally or alternatively, the device may perform aspects of the described functions using special-purpose hardware.

At 1505, the method may include receiving first control signaling indicating a second device in a wireless communications system. The operations of 1505 may be performed in accordance with examples as disclosed herein. In some examples, aspects of the operations of 1505 may be performed by a signal component 925 as described with reference to FIG. 9.

At 1510, the method may include identifying, based on the received first control signaling, a set of devices for tracking the second device in the wireless communications system. The operations of 1510 may be performed in accordance with examples as disclosed herein. In some examples, aspects of the operations of 1510 may be performed by a device set component 930 as described with reference to FIG. 9.

At 1515, the method may include transmitting second control signaling to the set of devices for tracking the second device in the wireless communications system. The operations of 1515 may be performed in accordance with examples as disclosed herein. In some examples, aspects of the operations of 1515 may be performed by a signal component 925 as described with reference to FIG. 9.

At 1520, the method may include receiving, from the set of devices, coordination information associated with the second device based on the transmitted second control signaling. The operations of 1520 may be performed in accordance with examples as disclosed herein. In some examples, aspects of the operations of 1520 may be performed by a coordination information component 935 as described with reference to FIG. 9.

Figure 16:
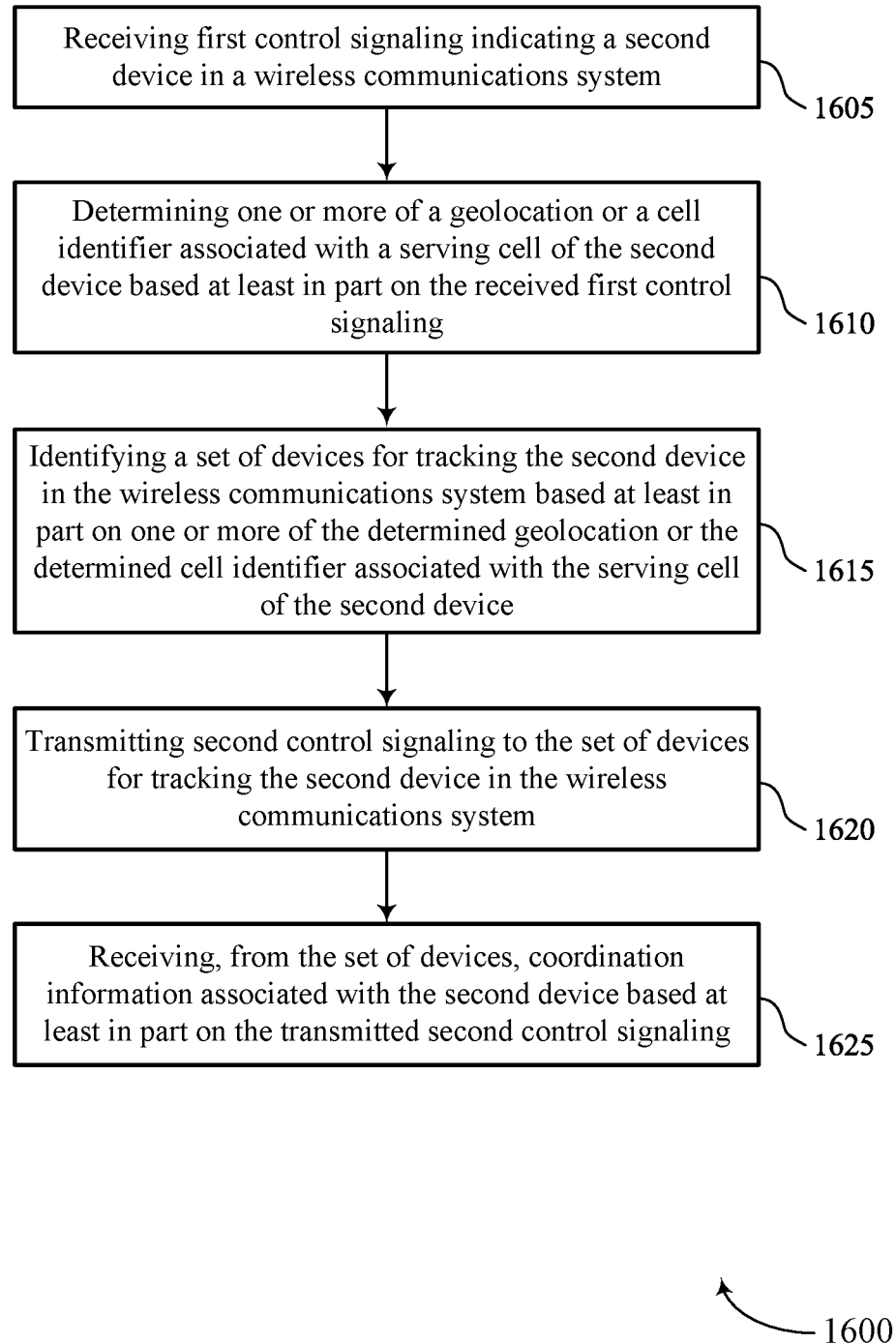

FIG. 16 shows a flowchart illustrating a method 1600 that supports techniques for managing wireless analytics in sidelink communications in accordance with various aspects of the present disclosure. The operations of the method 1600 may be implemented by a device (e.g., a network entity, such as a base station, an application server, among other examples) or its components as described herein. For example, the operations of the method 1600 may be performed by a device as described with reference to FIGS. 1 through 10. In some examples, a device may execute a set of instructions to control the functional elements of the device to perform the described functions. Additionally or alternatively, the device may perform aspects of the described functions using special-purpose hardware.

At 1605, the method may include receiving first control signaling indicating a second device in a wireless communications system. The operations of 1605 may be performed in accordance with examples as disclosed herein. In some examples, aspects of the operations of 1605 may be performed by a signal component 925 as described with reference to FIG. 9.

At 1610, the method may include determining one or more of a geolocation or a cell identifier associated with a serving cell of the second device based at least in part on the received first control signaling. The operations of 1610 may be performed in accordance with examples as disclosed herein. In some examples, aspects of the operations of 1610 may be performed by a geolocation component 940 as described with reference to FIG. 9.

At 1615, the method may include identifying a set of devices for tracking the second device in the wireless communications system based on one or more of the determined geolocation or the determined cell identifier associated with the serving cell of the second device. The operations of 1615 may be performed in accordance with examples as disclosed herein. In some examples, aspects of the operations of 1615 may be performed by a device set component 930 as described with reference to FIG. 9.

At 1620, the method may include transmitting second control signaling to the set of devices for tracking the second device in the wireless communications system. The operations of 1620 may be performed in accordance with examples as disclosed herein. In some examples, aspects of the operations of 1620 may be performed by a signal component 925 as described with reference to FIG. 9.

At 1625, the method may include receiving, from the set of devices, coordination information associated with the second device based on the transmitted second control signaling. The operations of 1625 may be performed in accordance with examples as disclosed herein. In some examples, aspects of the operations of 1625 may be performed by a coordination information component 935 as described with reference to FIG. 9.

Figure 17:
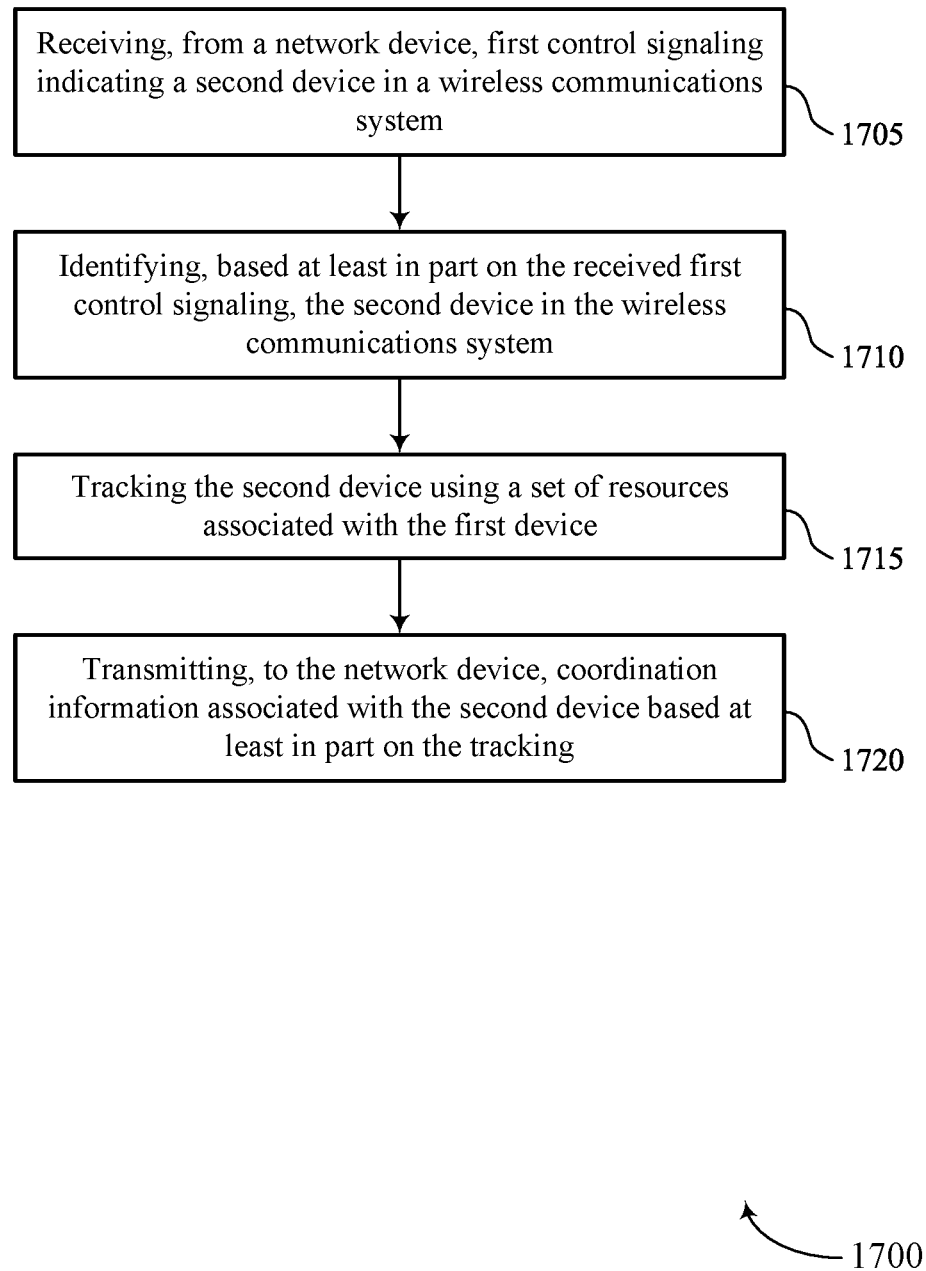

FIG. 17 shows a flowchart illustrating a method 1700 that supports techniques for managing wireless analytics in sidelink communications in accordance with various aspects of the present disclosure. The operations of the method 1700 may be implemented by a UE or its components as described herein. For example, the operations of the method 1700 may be performed by a UE as described with reference to FIGS. 1 through 6 and 11 through 14. In some examples, a UE may execute a set of instructions to control the functional elements of the UE to perform the described functions. Additionally or alternatively, the UE may perform aspects of the described functions using special-purpose hardware.

At 1705, the method may include receiving, from a network device, first control signaling indicating a second device in a wireless communications system. The operations of 1705 may be performed in accordance with examples as disclosed herein. In some examples, aspects of the operations of 1705 may be performed by a signal component 1325 as described with reference to FIG. 13.

At 1710, the method may include identifying, based on the received first control signaling, the second device in the wireless communications system. The operations of 1710 may be performed in accordance with examples as disclosed herein. In some examples, aspects of the operations of 1710 may be performed by a second device component 1330 as described with reference to FIG. 13.

At 1715, the method may include tracking the second device using a set of resources associated with the first device. The operations of 1715 may be performed in accordance with examples as disclosed herein. In some examples, aspects of the operations of 1715 may be performed by a tracking component 1335 as described with reference to FIG. 13.

At 1720, the method may include transmitting, to the network device, coordination information associated with the second device based on the tracking. The operations of 1720 may be performed in accordance with examples as disclosed herein. In some examples, aspects of the operations of 1720 may be performed by a coordination information component 1340 as described with reference to FIG. 13.

Figure 18:
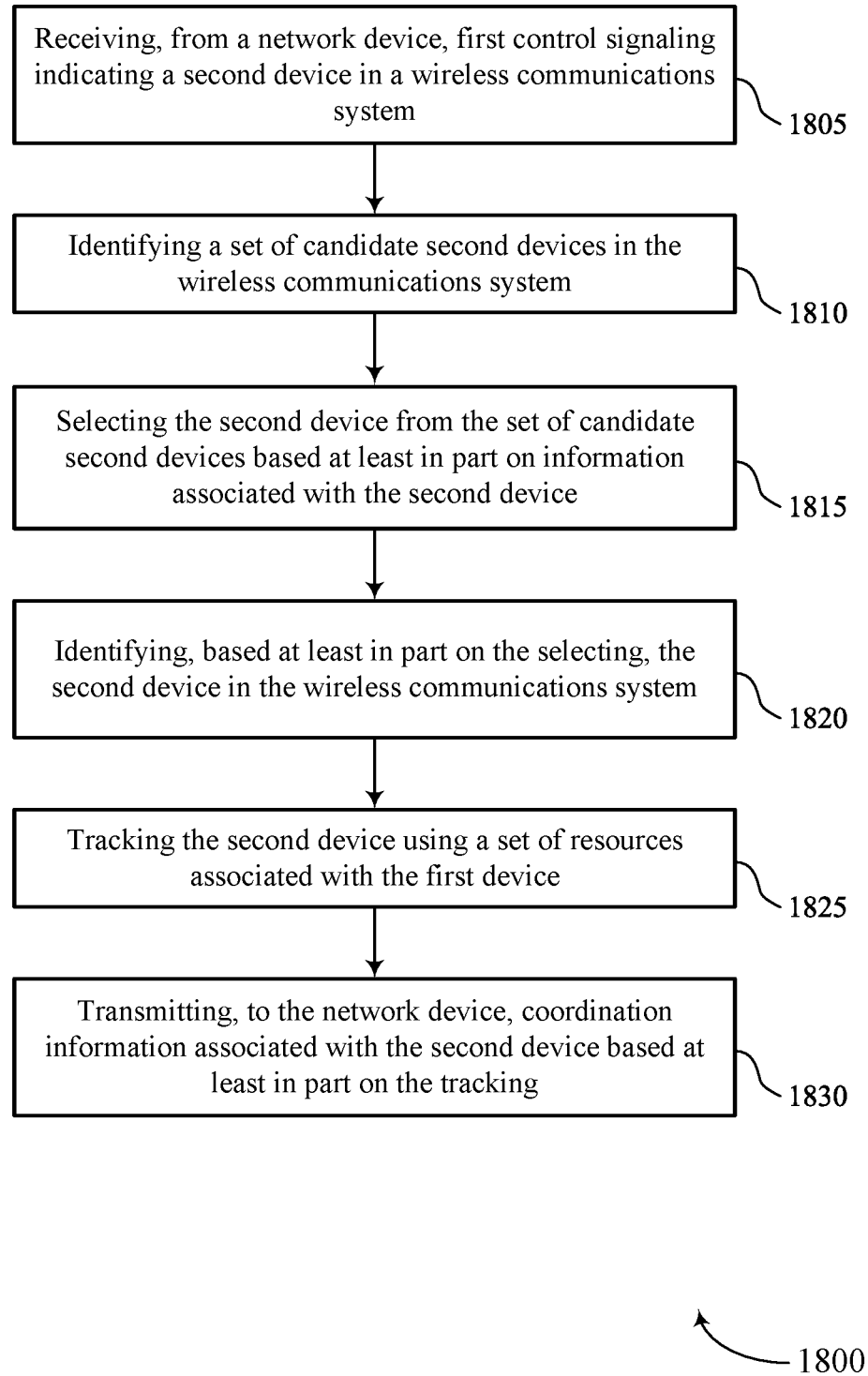

FIG. 18 shows a flowchart illustrating a method 1800 that supports techniques for managing wireless analytics in sidelink communications in accordance with various aspects of the present disclosure. The operations of the method 1800 may be implemented by a UE or its components as described herein. For example, the operations of the method 1800 may be performed by a UE as described with reference to FIGS. 1 through 6 and 11 through 14. In some examples, a UE may execute a set of instructions to control the functional elements of the UE to perform the described functions. Additionally or alternatively, the UE may perform aspects of the described functions using special-purpose hardware.

At 1805, the method may include receiving, from a network device, first control signaling indicating a second device in a wireless communications system. The operations of 1805 may be performed in accordance with examples as disclosed herein. In some examples, aspects of the operations of 1805 may be performed by a signal component 1325 as described with reference to FIG. 13.

At 1810, the method may include identifying a set of candidate second devices in the wireless communications system. The operations of 1810 may be performed in accordance with examples as disclosed herein. In some examples, aspects of the operations of 1810 may be performed by a candidate set component 1345 as described with reference to FIG. 13.

At 1815, the method may include selecting the second device from the set of candidate second devices based on information associated with the second device, where identifying the second device in the wireless communications system is based on the selecting. The operations of 1815 may be performed in accordance with examples as disclosed herein. In some examples, aspects of the operations of 1815 may be performed by a second device component 1330 as described with reference to FIG. 13.

At 1820, the method may include identifying, based on the selecting, the second device in the wireless communications system. The operations of 1820 may be performed in accordance with examples as disclosed herein. In some examples, aspects of the operations of 1820 may be performed by a second device component 1330 as described with reference to FIG. 13.

At 1825, the method may include tracking the second device using a set of resources associated with the first device. The operations of 1825 may be performed in accordance with examples as disclosed herein. In some examples, aspects of the operations of 1825 may be performed by a tracking component 1335 as described with reference to FIG. 13.

At 1830, the method may include transmitting, to the network device, coordination information associated with the second device based on the tracking. The operations of 1830 may be performed in accordance with examples as disclosed herein. In some examples, aspects of the operations of 1830 may be performed by a coordination information component 1340 as described with reference to FIG. 13.

The following provides an overview of aspects of the present disclosure:

Aspect 1: A method for wireless communication at a first device, comprising: receiving first control signaling indicating a second device in a wireless communications system; identifying, based at least in part on the received first control signaling, a set of devices for tracking the second device in the wireless communications system; transmitting second control signaling to the set of devices for tracking the second device in the wireless communications system; and receiving, from the set of devices, coordination information associated with the second device based at least in part on the transmitted second control signaling.

Aspect 2: The method of aspect 1, further comprising: determining one or more of a geolocation or a cell identifier associated with a serving cell of the second device based at least in part on the received first control signaling, wherein identifying the set of devices for tracking the second device is based at least in part on one or more of the geolocation or the cell identifier associated with the serving cell of the second device.

Aspect 3: The method of any of aspects 1 through 2, further comprising: determining a geolocation and a mobility trace of the second device based at least in part on the received first control signaling, wherein identifying the set of devices for tracking the second device is based at least in part on the geolocation and the mobility trace of the second device.

Aspect 4: The method of any of aspects 1 through 3, further comprising: determining capability information associated with each device of the set of devices, the determined capability information indicating a set of resources; and selecting the set of devices for tracking the second device based at least in part on the determined capability information, wherein transmitting the second control signaling is based at least in part on selecting the set of devices for tracking the second device.

Aspect 5: The method of any of aspects 1 through 4, further comprising: determining mobility information associated with each device of the set of devices, the determined mobility information indicating an estimated route of each device of the set of devices in the wireless communications system; and selecting the set of devices for tracking the second device based at least in part on the determined mobility information, wherein transmitting the second control signaling is based at least in part on selecting the set of devices for tracking the second device.

Aspect 6: The method of any of aspects 1 through 5, further comprising: selecting a node in the wireless communications system for communicating the second control signaling based at least in part on a geolocation of one or more devices of the set of devices, the selected node including a roadside unit or a base station, wherein transmitting the second control signaling to the set of devices is based at least in part on the selected node in the wireless communications system.

Aspect 7: The method of any of aspects 1 through 6, wherein the second control signaling includes a service type parameter indicating one or more of a provider service identifier, an intelligent transportation system application identifier, or an application identifier.

Aspect 8: The method of any of aspects 1 through 7, further comprising: transmitting, to the second device, third control signaling to enable a sidelink ranging operation, wherein tracking the second device is based at least in part on the sidelink ranging operation.

Aspect 9: The method of any of aspects 1 through 8, further comprising: transmitting third control signaling requesting the second device to measure one or more metrics associated with sidelink communication over a sidelink; and receiving fourth control signaling including a report of the one or more metrics, wherein the second control signaling includes an indication of the one or more metrics associated with the sidelink communication identifying the second device in the wireless communications system.

Aspect 10: The method of aspect 9, wherein the one or more metrics comprise an RSRP, an RSSI, or a combination thereof.

Aspect 11: The method of any of aspects 1 through 10, further comprising: transmitting, in the second control signaling, an indication for the set of devices to form a group for tracking the second device in the wireless communications system, the set of devices in the formed group sharing sensing information over a sidelink for tracking the second device.

Aspect 12: The method of any of aspects 1 through 11, further comprising: determining channel estimation associated with the second device in the wireless communications system based at least in part on the received coordination information; and performing the wireless communication with the second device based at least in part on the determined channel estimation associated with the second device.

Aspect 13: The method of any of aspects 1 through 12, further comprising: determining interference information associated with the second device in the wireless communications system based at least in part on the received coordination information; and performing the wireless communication with the second device based at least in part on the determined interference information associated with the second device.

Aspect 14: The method of any of aspects 1 through 13, further comprising: updating the set of devices with one or more parameters for tracking the second device based at least in part on the received first control signaling, the one or more parameters corresponding to network conditions associated with the second device, wherein identifying the set of devices for tracking the second device is based at least in part on the updating.

Aspect 15: The method of aspect 14, further comprising: performing one or more of a beam management operation or a resource allocation operation based at least in part on the received coordination information.

Aspect 16: The method of any of aspects 1 through 15, wherein the first device includes a V2X application server; the wireless communications system includes a C-V2X system; the set of devices includes a set of vehicles; and the second device includes a UE.

Aspect 17: A method for wireless communication at a first device, comprising: receiving, from a network device, first control signaling indicating a second device in a wireless communications system; identifying, based at least in part on the received first control signaling, the second device in the wireless communications system; tracking the second device using a set of resources associated with the first device; and transmitting, to the network device, coordination information associated with the second device based at least in part on the tracking.

Aspect 18: The method of aspect 17, further comprising: identifying a set of candidate second devices in the wireless communications system; and selecting the second device from the set of candidate second devices based at least in part on information associated with the second device, wherein identifying the second device in the wireless communications system is based at least in part on the selecting.

Aspect 19: The method of aspect 17, further comprising: transmitting second control signaling requesting additional information associated with the second device based at least in part on a condition, the condition including an unsuccessful attempt to identify the second device; and receiving third control signaling indicating the additional information associated with the second device based at least in part on the transmitted second control signaling.

Aspect 20: The method of any of aspects 17 through 19, further comprising: broadcasting a sidelink message to enable a sidelink ranging operation at the second device, wherein identifying the second device in the wireless communications system is based at least in part on the sidelink ranging operation.

Aspect 21: The method of any of aspects 17 through 20, further comprising: determining to form a group of devices for tracking the second device in the wireless communications system based at least in part on the received first control signaling, the set of devices in the formed group sharing sensing information over a sidelink for tracking the second device, wherein tracking the second device is based at least in part on the group of devices.

Aspect 22: The method of aspect 21, further comprising: determining a sidelink ranging coordination between the group of devices based at least in part on the received first control signaling; performing a sidelink ranging operation based at least in part on the determined sidelink ranging coordination, wherein tracking the second device is based at least in part on the performed sidelink ranging operation.

Aspect 23: The method of any of aspects 17 through 22, further comprising: performing a sidelink ranging operation based at least in part on an estimated route of the first device and a geolocation of the second device in the wireless communications system, wherein tracking the second device is based at least in part on the performed sidelink ranging operation.

Aspect 24: The method of any of aspects 17 through 23, further comprising: determining channel estimation associated with the second device in the wireless communications system based at least in part on tracking the second device, wherein the coordination information includes the determined channel estimation associated with the second device.

Aspect 25: The method of any of aspects 17 through 24, further comprising: determining interference information associated with the second device in the wireless communications system based at least in part on tracking the second device, wherein the coordination information includes the determined interference information associated with the second device.

Aspect 26: The method of any of aspects 17 through 25, wherein the first device includes a vehicle; the wireless communications system includes a C-V2X system; and the second device includes a UE.

Aspect 27: An apparatus for wireless communication at a first device, comprising a processor; memory coupled with the processor; and instructions stored in the memory and executable by the processor to cause the apparatus to perform a method of any of aspects 1 through 16.

Aspect 28: An apparatus for wireless communication at a first device, comprising at least one means for performing a method of any of aspects 1 through 16.

Aspect 29: A non-transitory computer-readable medium storing code for wireless communication at a first device, the code comprising instructions executable by a processor to perform a method of any of aspects 1 through 16.

Aspect 30: An apparatus for wireless communication at a first device, comprising a processor; memory coupled with the processor; and instructions stored in the memory and executable by the processor to cause the apparatus to perform a method of any of aspects 17 through 26.

Aspect 31: An apparatus for wireless communication at a first device, comprising at least one means for performing a method of any of aspects 17 through 26.

Aspect 32: A non-transitory computer-readable medium storing code for wireless communication at a first device, the code comprising instructions executable by a processor to perform a method of any of aspects 17 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the present disclosure may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the present disclosure. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device, comprising:
   receiving first control signaling indicating a second device in a wireless communications system;
   identifying, based at least in part on the received first control signaling, a set of devices for tracking the second device in the wireless communications system;
   transmitting second control signaling to the set of devices for tracking the second device in the wireless communications system; and
   receiving, from the set of devices, coordination information associated with the second device based at least in part on the transmitted second control signaling.

2. The method of claim 1, wherein:
   the second control signaling includes a service type parameter indicating one or more of a provider service identifier, an intelligent transportation system application identifier, or an application identifier.

3. The method of claim 1, further comprising:
   transmitting, to the second device, third control signaling to enable a sidelink ranging operation,
   wherein tracking the second device is based at least in part on the sidelink ranging operation.

4. The method of claim 1, further comprising:
   transmitting third control signaling requesting the second device to measure one or more metrics associated with sidelink communication over a sidelink; and
   receiving fourth control signaling including a report of the one or more metrics,
   wherein the second control signaling includes an indication of the one or more metrics associated with the sidelink communication identifying the second device in the wireless communications system.

5. The method of claim 4, wherein the one or more metrics comprise a reference signal received power, a reference signal strength indicator, or a combination thereof.

6. The method of claim 1, further comprising:
transmitting, in the second control signaling, an indication for the set of devices to form a group for tracking the second device in the wireless communications system, the set of devices in the formed group sharing sensing information over a sidelink for tracking the second device.

7. The method of claim 1, wherein:
the first device includes a vehicle-to-everything application server;
the wireless communications system includes a cellular vehicle-to-everything system;
the set of devices includes a set of vehicles; and
the second device includes a user equipment (UE).

8. A method for wireless communication at a first device, comprising:
receiving, from a network device, first control signaling indicating a second device in a wireless communications system;
identifying, based at least in part on the received first control signaling, the second device in the wireless communications system;
tracking the second device using a set of resources associated with the first device; and
transmitting, to the network device, coordination information associated with the second device based at least in part on the tracking.

9. The method of claim 8, further comprising:
broadcasting a sidelink message to enable a sidelink ranging operation at the second device,
wherein identifying the second device in the wireless communications system is based at least in part on the sidelink ranging operation.

10. The method of claim 8, further comprising:
forming a group of devices for tracking the second device in the wireless communications system based at least in part on the received first control signaling, a set of devices in the formed group sharing sensing information over a sidelink for tracking the second device,
wherein tracking the second device is based at least in part on the formed group of devices.

11. The method of claim 10, further comprising:
determining a sidelink ranging coordination between the group of devices based at least in part on the received first control signaling; and
performing a sidelink ranging operation based at least in part on the determined sidelink ranging coordination,
wherein tracking the second device is based at least in part on the performed sidelink ranging operation.

12. The method of claim 8, further comprising:
performing a sidelink ranging operation based at least in part on an estimated route of the first device and a geolocation of the second device in the wireless communications system,
wherein tracking the second device is based at least in part on the performed sidelink ranging operation.

13. The method of claim 8, wherein:
the first device includes a vehicle;
the wireless communications system includes a cellular vehicle-to-everything system; and
the second device includes a user equipment (UE).

14. An apparatus for wireless communication at a first device, comprising:
a processor;
memory coupled with the processor; and
instructions stored in the memory and executable by the processor to cause the apparatus to:
receive first control signaling indicating a second device in a wireless communications system;
identify, based at least in part on the received first control signaling, a set of devices for tracking the second device in the wireless communications system;
transmit second control signaling to the set of devices for tracking the second device in the wireless communications system; and
receive, from the set of devices, coordination information associated with the second device based at least in part on the transmitted second control signaling.

15. The apparatus of claim 14, wherein:
the first device includes a vehicle-to-everything application server;
the wireless communications system includes a cellular vehicle-to-everything system;
the set of devices includes a set of vehicles; and
the second device includes a user equipment (UE).

16. The apparatus of claim 14, wherein:
the second control signaling includes a service type parameter indicating one or more of a provider service identifier, an intelligent transportation system application identifier, or an application identifier.

17. The apparatus of claim 14, wherein the instructions are further executable by the processor to cause the apparatus to:
transmit, to the second device, third control signaling to enable a sidelink ranging operation,
wherein to track the second device is based at least in part on the sidelink ranging operation.

18. The apparatus of claim 14, wherein the instructions are further executable by the processor to cause the apparatus to:
transmit third control signaling requesting the second device to measure one or more metrics associated with sidelink communication over a sidelink; and
receive fourth control signaling including a report of the one or more metrics,
wherein the second control signaling includes an indication of the one or more metrics associated with the sidelink communication identifying the second device in the wireless communications system.

19. The apparatus of claim 18, wherein:
the one or more metrics comprise a reference signal received power, a reference signal strength indicator, or a combination thereof.

20. The apparatus of claim 14, wherein the instructions are further executable by the processor to cause the apparatus to:
transmit, in the second control signaling, an indication for the set of devices to form a group for tracking the second device in the wireless communications system, the set of devices in the formed group sharing sensing information over a sidelink for tracking the second device.

21. An apparatus for wireless communication at a first device, comprising:
a processor;
memory coupled with the processor; and
instructions stored in the memory and executable by the processor to cause the apparatus to:
receive, from a network device, first control signaling indicating a second device in a wireless communications system;
identify, based at least in part on the received first control signaling, the second device in the wireless communications system;

track the second device using a set of resources associated with the first device; and transmit, to the network device, coordination information associated with the second device based at least in part on the tracking.

22. The apparatus of claim 21, wherein:

the first device includes a vehicle;

the wireless communications system includes a cellular vehicle-to-everything system; and the second device includes a user equipment (UE).

23. The apparatus of claim 21, wherein the instructions are further executable by the processor to cause the apparatus to:

broadcast a sidelink message to enable a sidelink ranging operation at the second device, wherein to identify the second device in the wireless communications system is based at least in part on the sidelink ranging operation.

24. The apparatus of claim 21, wherein the instructions are further executable by the processor to cause the apparatus to:

form a group of devices for tracking the second device in the wireless communications system based at least in part on the received first control signaling, a set of devices in the formed group sharing sensing information over a sidelink for tracking the second device, wherein to track the second device is based at least in part on the formed group of devices.

25. The apparatus of claim 24, wherein the instructions are further executable by the processor to cause the apparatus to:

determine a sidelink ranging coordination between the group of devices based at least in part on the received first control signaling; and perform a sidelink ranging operation based at least in part on the determined sidelink ranging coordination, wherein to track the second device is based at least in part on the performed sidelink ranging operation.

26. The apparatus of claim 21, wherein the instructions are further executable by the processor to cause the apparatus to:

perform a sidelink ranging operation based at least in part on an estimated route of the first device and a geolocation of the second device in the wireless communications system, wherein to track the second device is based at least in part on the performed sidelink ranging operation.

* * * * *